(12) United States Patent
Collins et al.

(10) Patent No.: US 10,900,224 B2
(45) Date of Patent: Jan. 26, 2021

(54) PREFABRICATED DEMISING WALL WITH EXTERNAL CONDUIT ENGAGEMENT FEATURES

(71) Applicant: Innovative Building Technologies, LLC, Seattle, WA (US)

(72) Inventors: Arlan Collins, Seattle, WA (US); Mark Woerman, Seattle, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 0 days.

(21) Appl. No.: 16/082,856

(22) PCT Filed: Mar. 7, 2017

(86) PCT No.: PCT/US2017/021174
§ 371 (c)(1),
(2) Date: Sep. 6, 2018

(87) PCT Pub. No.: WO2017/156011
PCT Pub. Date: Sep. 14, 2017

(65) Prior Publication Data
US 2019/0093345 A1 Mar. 28, 2019

Related U.S. Application Data

(60) Provisional application No. 62/304,868, filed on Mar. 7, 2016.

(51) Int. Cl.
*E04B 2/74* (2006.01)
*E04C 2/52* (2006.01)
(Continued)

(52) U.S. Cl.
CPC ............ *E04B 2/7448* (2013.01); *A62C 35/68* (2013.01); *E04B 1/0023* (2013.01); *E04B 1/942* (2013.01);
(Continued)

(58) Field of Classification Search
CPC ........ E04B 2/52; E04B 2/7448; E04B 1/0023; E04B 2/00; E04B 2/02; E04B 1/942;
(Continued)

(56) References Cited

U.S. PATENT DOCUMENTS 1,168,556 A  1/1916  Robinson et al.
1,501,288 A  7/1924  Morley
(Continued)

FOREIGN PATENT DOCUMENTS

AU  2005200682  5/2005
AU  2012211472  2/2014
(Continued)

OTHER PUBLICATIONS

US 8,701,371 B2, 04/2014, Collins et al. (withdrawn)
(Continued)

*Primary Examiner* — Jessie T Fonseca

(57) ABSTRACT

A prefabricated demising wall assembly comprising two substrate panels each with an interior and exterior surface, the substrate panels configured to span between a floor and a ceiling of a building unit; a plurality of metal studs connecting the interior surfaces of the two substrate panels, wherein the plurality of metal studs define a space between the substrate panels; a fire sprinkler pipeline between the two substrate panels, wherein at least some of the plurality of metal studs have an aperture accommodating the fire sprinkler pipeline through an interior of the demising wall assembly; and a plurality of hanger elements operably attached to the exterior surfaces of the two substrate panels, wherein the plurality of hanger elements are configured to connect to a plurality of removable finish panels.

23 Claims, 5 Drawing Sheets

(51) Int. Cl.

| | | |
|---|---|---|
| H02G 3/38 | (2006.01) | |
| E04B 1/00 | (2006.01) | |
| E04B 2/00 | (2006.01) | |
| E04B 2/42 | (2006.01) | |
| A62C 35/68 | (2006.01) | |
| E04B 2/02 | (2006.01) | |
| E04B 1/94 | (2006.01) | |
| E04B 2/52 | (2006.01) | |
| E04B 2/72 | (2006.01) | |
| E04F 13/08 | (2006.01) | |

(52) U.S. Cl.
CPC ............... *E04B 2/00* (2013.01); *E04B 2/02* (2013.01); *E04B 2/42* (2013.01); *E04B 2/52* (2013.01); *E04B 2/721* (2013.01); *E04C 2/521* (2013.01); *E04F 13/0832* (2013.01); *H02G 3/388* (2013.01); *E04B 2/7409* (2013.01); *E04B 2002/028* (2013.01); *E04B 2002/0243* (2013.01)

(58) Field of Classification Search
CPC ............... E04B 2/721; E04B 2/7409; E04B 2002/0243; E04B 2002/028; E04B 1/94; E04B 2/42; E04C 2/521; H02G 3/388; A62C 35/68; E04F 13/0832
See application file for complete search history.

(56) References Cited

U.S. PATENT DOCUMENTS

| | | | |
|---|---|---|---|
| 1,876,528 A | 7/1931 | Walters | |
| 1,883,376 A | 10/1932 | George et al. | |
| 2,160,161 A | 5/1939 | Marsh | |
| 2,419,319 A | 4/1947 | Lankton | |
| 2,495,862 A | 1/1950 | Osborn | |
| 2,562,050 A | 7/1951 | Lankton | |
| 2,686,420 A | 8/1954 | Youtz | |
| 2,722,724 A | 11/1955 | Miller | |
| 2,758,467 A | 8/1956 | Brown et al. | |
| 2,871,544 A | 2/1959 | Youtz | |
| 2,871,997 A | 2/1959 | Simpson et al. | |
| 2,877,990 A | 3/1959 | Goemann | |
| 2,946,413 A | 7/1960 | Weismann | |
| 3,017,723 A | 1/1962 | Von Heidenstam | |
| 3,052,449 A | 9/1962 | Long et al. | |
| 3,053,015 A | 9/1962 | George | |
| 3,053,509 A | 9/1962 | Haupt et al. | |
| 3,065,575 A | 11/1962 | Ray | |
| 3,079,652 A | 3/1963 | Wahlfeld | |
| 3,090,164 A * | 5/1963 | Nelsson | E04F 13/0803 52/346 |
| 3,184,893 A | 5/1965 | Booth | |
| 3,221,454 A | 12/1965 | Giulio | |
| 3,235,917 A | 2/1966 | Skubic | |
| 3,236,014 A | 2/1966 | Edgar | |
| 3,245,183 A | 4/1966 | Tessin | |
| 3,281,172 A | 10/1966 | Kuehl | |
| 3,315,424 A | 4/1967 | Smith | |
| 3,324,615 A * | 6/1967 | Zinn | E04B 2/7409 52/241 |
| 3,324,617 A | 6/1967 | Knight et al. | |
| 3,355,853 A | 12/1967 | Wallace | |
| 3,376,919 A | 4/1968 | Agostino | |
| 3,388,512 A | 6/1968 | Newman | |
| 3,392,497 A | 7/1968 | Vantine | |
| 3,411,252 A | 11/1968 | Boyle, Jr. | |
| 3,460,302 A | 8/1969 | Cooper | |
| 3,469,873 A | 9/1969 | Glaros | |
| 3,490,191 A | 1/1970 | Ekblom | |
| 3,533,205 A * | 10/1970 | Lankford | E04B 2/58 52/356 |
| 3,568,380 A | 3/1971 | Stucky et al. | |
| 3,579,935 A | 5/1971 | Regan et al. | |
| 3,590,393 A | 7/1971 | Hollander | |
| 3,594,965 A | 7/1971 | Saether | |
| 3,601,937 A | 8/1971 | Campbell | |
| 3,604,174 A | 9/1971 | Nelson, Jr. | |
| 3,608,258 A | 9/1971 | Spratt | |
| 3,614,803 A | 10/1971 | Matthews | |
| 3,638,380 A | 2/1972 | Perri | |
| 3,707,165 A | 12/1972 | Stahl | |
| 3,713,265 A | 1/1973 | Wysocki et al. | |
| 3,721,056 A | 3/1973 | Toan | |
| 3,722,169 A | 3/1973 | Boehmig | |
| 3,727,753 A | 4/1973 | Starr | |
| 3,742,666 A | 7/1973 | Antoniou | |
| 3,750,366 A | 8/1973 | Rich, Jr. et al. | |
| 3,751,864 A | 8/1973 | Berger et al. | |
| 3,755,974 A | 9/1973 | Berman | |
| 3,762,115 A | 10/1973 | McCaul, III | |
| 3,766,574 A | 10/1973 | Smid, Jr. | |
| 3,821,818 A | 7/1974 | Alosi | |
| 3,823,520 A | 7/1974 | Ohta et al. | |
| 3,845,601 A | 11/1974 | Kostecky | |
| 3,853,452 A | 12/1974 | Delmonte | |
| 3,885,367 A | 5/1975 | Thunberg | |
| 3,906,686 A | 9/1975 | Dillon | |
| 3,921,362 A | 11/1975 | Ortega | |
| 3,926,486 A | 12/1975 | Sasnett | |
| 3,971,605 A | 7/1976 | Sasnett | |
| 3,974,618 A | 8/1976 | Cortina | |
| 3,990,202 A | 11/1976 | Becker | |
| 4,018,020 A | 4/1977 | Sauer et al. | |
| 4,038,796 A | 8/1977 | Eckel | |
| 4,050,215 A | 9/1977 | Fisher | |
| 4,059,936 A | 11/1977 | Lukens | |
| 4,065,905 A | 1/1978 | Lely et al. | |
| 4,078,345 A | 3/1978 | Piazzalunga | |
| 4,107,886 A | 8/1978 | Ray | |
| 4,112,173 A | 9/1978 | Roudebush | |
| 4,114,335 A | 9/1978 | Carroll | |
| 4,142,255 A | 3/1979 | Togni | |
| 4,161,087 A | 7/1979 | Levesque | |
| 4,170,858 A * | 10/1979 | Walker | E04B 2/7409 29/897.32 |
| 4,171,545 A | 10/1979 | Kann | |
| 4,176,504 A | 12/1979 | Huggins | |
| 4,178,343 A | 12/1979 | Rojo, Jr. | |
| 4,205,719 A | 6/1980 | Norell et al. | |
| 4,206,162 A | 6/1980 | Vanderklaauw | |
| 4,214,413 A | 7/1980 | Gonzalez Espinosa de Los Monteros | |
| 4,221,441 A | 9/1980 | Bain | |
| 4,226,061 A | 10/1980 | Day, Jr. | |
| 4,227,360 A * | 10/1980 | Balinski | E04B 2/7409 52/243 |
| 4,248,020 A | 2/1981 | Zielinski et al. | |
| 4,251,974 A | 2/1981 | Vanderklaauw | |
| 4,280,307 A | 7/1981 | Griffin | |
| 4,314,430 A | 2/1982 | Farrington | |
| 4,325,205 A | 4/1982 | Salim | |
| 4,327,529 A | 5/1982 | Bigelow, Jr. | |
| 4,341,052 A | 7/1982 | Douglass, Jr. | |
| 4,361,994 A | 12/1982 | Carver | |
| 4,389,831 A | 6/1983 | Baumann | |
| 4,397,127 A | 8/1983 | Mieyal | |
| 4,435,927 A | 3/1984 | Umezu | |
| 4,441,286 A | 4/1984 | Skvaril | |
| 4,447,987 A | 5/1984 | Lesosky | |
| 4,447,996 A | 5/1984 | Maurer, Jr. | |
| 4,477,934 A | 10/1984 | Salminen | |
| 4,507,901 A | 4/1985 | Carroll | |
| 4,513,545 A | 4/1985 | Hopkins, Jr. | |
| 4,528,793 A | 7/1985 | Johnson | |
| 4,531,336 A | 7/1985 | Gartner | |
| 4,592,175 A | 6/1986 | Werner | |
| 4,646,495 A | 3/1987 | Chalik | |
| 4,648,228 A | 3/1987 | Kiselewski | |
| 4,655,011 A | 4/1987 | Borges | |
| 4,688,750 A | 8/1987 | Teague et al. | |
| 4,712,352 A | 12/1987 | Low | |
| 4,757,663 A | 7/1988 | Kuhr | |

(56) References Cited

U.S. PATENT DOCUMENTS

| | | | |
|---|---|---|---|
| 4,813,193 A | 3/1989 | Altizer | |
| 4,856,244 A | 8/1989 | Clapp | |
| 4,862,663 A | 9/1989 | Krieger | |
| 4,893,435 A | 1/1990 | Shalit | |
| 4,910,932 A | 3/1990 | Honigman | |
| 4,918,897 A * | 4/1990 | Luedtke | E04B 1/16 52/291 |
| 4,919,164 A | 4/1990 | Barenburg | |
| 4,974,366 A | 12/1990 | Tizzoni | |
| 4,991,368 A | 2/1991 | Amstutz | |
| 5,009,043 A | 4/1991 | Kurrasch | |
| 5,010,690 A | 4/1991 | Geoffrey | |
| 5,036,638 A | 8/1991 | Kurtz, Jr. | |
| 5,076,310 A | 12/1991 | Barenburg | |
| 5,079,890 A | 1/1992 | Kubik et al. | |
| 5,127,203 A | 7/1992 | Paquette | |
| 5,127,760 A | 7/1992 | Brady | |
| 5,154,029 A | 10/1992 | Sturgeon | |
| 5,185,971 A | 2/1993 | Johnson, Jr. | |
| 5,205,091 A | 4/1993 | Brown | |
| 5,212,921 A | 5/1993 | Unruh | |
| 5,228,254 A | 7/1993 | Honeycutt, Jr. | |
| 5,233,810 A | 8/1993 | Jennings | |
| 5,254,203 A | 10/1993 | Corston | |
| 5,307,600 A | 5/1994 | Simon, Jr. | |
| 5,359,816 A | 11/1994 | Iacouides | |
| 5,359,820 A | 11/1994 | McKay | |
| 5,361,556 A | 11/1994 | Menchetti | |
| 5,402,612 A | 4/1995 | diGirolamo et al. | |
| 5,412,913 A | 5/1995 | Daniels et al. | |
| 5,426,894 A | 6/1995 | Headrick | |
| 5,452,552 A | 9/1995 | Ting | |
| 5,459,966 A | 10/1995 | Suarez | |
| 5,471,804 A | 12/1995 | Winter, IV | |
| 5,483,773 A | 1/1996 | Parisien | |
| 5,493,838 A | 2/1996 | Ross | |
| 5,509,242 A | 4/1996 | Rechsteiner et al. | |
| 5,519,971 A | 5/1996 | Ramirez | |
| 5,528,877 A | 6/1996 | Franklin | |
| 5,531,539 A | 7/1996 | Crawford | |
| 5,584,142 A | 12/1996 | Spiess | |
| 5,592,796 A | 1/1997 | Landers | |
| 5,593,115 A | 1/1997 | Lewis | |
| 5,611,173 A | 3/1997 | Headrick et al. | |
| 5,628,158 A | 5/1997 | Porter | |
| 5,640,824 A | 6/1997 | Johnson | |
| 5,660,017 A | 8/1997 | Houghton | |
| 5,678,384 A | 10/1997 | Maze | |
| 5,697,189 A | 12/1997 | Miller | |
| 5,699,643 A | 12/1997 | Kinard | |
| 5,706,607 A | 1/1998 | Frey | |
| 5,724,773 A | 3/1998 | Hall | |
| 5,735,100 A | 4/1998 | Campbell | |
| 5,743,330 A | 4/1998 | Bilotta et al. | |
| 5,746,034 A | 5/1998 | Luchetti et al. | |
| 5,755,982 A | 5/1998 | Strickland | |
| 5,850,686 A | 12/1998 | Mertes | |
| 5,867,964 A | 2/1999 | Perrin | |
| 5,870,867 A | 2/1999 | Mitchell | |
| 5,921,041 A | 7/1999 | Egri, II | |
| 5,970,680 A | 10/1999 | Powers | |
| 5,987,841 A | 11/1999 | Campo | |
| 5,992,109 A | 11/1999 | Jonker | |
| 5,997,792 A | 12/1999 | Gordon | |
| 6,000,194 A | 12/1999 | Nakamura | |
| 6,055,787 A | 5/2000 | Gerhaher et al. | |
| 6,073,401 A | 6/2000 | Iri et al. | |
| 6,073,413 A | 6/2000 | Tongiatama | |
| 6,076,319 A | 6/2000 | Hendershot | |
| 6,086,350 A | 7/2000 | Del Monte | |
| 6,128,877 A | 10/2000 | Goodman et al. | |
| 6,151,851 A | 11/2000 | Carter | |
| 6,154,774 A | 11/2000 | Furlong | |
| 6,170,214 B1 | 1/2001 | Treister et al. | |
| 6,199,336 B1 | 3/2001 | Poliquin | |
| 6,240,704 B1 | 6/2001 | Porter | |
| 6,243,993 B1 | 6/2001 | Swensson | |
| 6,244,002 B1 | 6/2001 | Martin | |
| 6,244,008 B1 | 6/2001 | Miller | |
| 6,260,329 B1 | 7/2001 | Mills | |
| 6,289,646 B1 | 9/2001 | Watanabe | |
| 6,301,838 B1 | 10/2001 | Hall | |
| 6,308,465 B1 | 10/2001 | Galloway et al. | |
| 6,308,491 B1 | 10/2001 | Porter | |
| 6,340,508 B1 | 1/2002 | Frommelt | |
| 6,371,188 B1 | 4/2002 | Baczuk | |
| 6,393,774 B1 | 5/2002 | Fisher | |
| 6,421,968 B2 | 7/2002 | Degelsegger | |
| 6,427,407 B1 | 8/2002 | Wilson | |
| 6,430,883 B1 | 8/2002 | Paz et al. | |
| 6,446,396 B1 | 9/2002 | Marangoni et al. | |
| 6,481,172 B1 | 11/2002 | Porter | |
| 6,484,460 B2 | 11/2002 | VanHaitsma | |
| 6,571,523 B2 | 6/2003 | Chambers | |
| 6,625,937 B1 | 9/2003 | Parker | |
| 6,651,393 B2 | 11/2003 | Don | |
| 6,688,056 B2 | 2/2004 | Von Hoyningen Huene et al. | |
| 6,729,094 B1 | 5/2004 | Spencer et al. | |
| 6,748,709 B1 | 6/2004 | Sherman et al. | |
| 6,807,790 B2 | 10/2004 | Strickland et al. | |
| 6,837,013 B2 | 1/2005 | Foderberg et al. | |
| 6,922,960 B2 | 8/2005 | Sataka | |
| 6,935,079 B1 * | 8/2005 | Julian | E04B 2/7457 52/357 |
| 6,964,410 B1 | 11/2005 | Hansen | |
| 7,007,343 B2 | 3/2006 | Weiland | |
| 7,059,017 B1 | 6/2006 | Rosko | |
| 7,143,555 B2 | 12/2006 | Miller | |
| RE39,462 E | 1/2007 | Brady | |
| 7,389,620 B1 | 6/2008 | McManus | |
| 7,395,999 B2 | 7/2008 | Walpole | |
| 7,444,793 B2 | 11/2008 | Raftery et al. | |
| 7,467,469 B2 | 12/2008 | Wall | |
| 7,484,329 B2 | 2/2009 | Fiehler | |
| 7,484,339 B2 | 2/2009 | Fiehler | |
| 7,493,729 B1 | 2/2009 | Semmes | |
| 7,546,715 B2 | 6/2009 | Roen | |
| 7,574,837 B2 | 8/2009 | Hagen, Jr. et al. | |
| 7,640,702 B2 | 1/2010 | Termohlen | |
| 7,658,045 B2 | 2/2010 | Elliott et al. | |
| 7,676,998 B2 | 3/2010 | Lessard | |
| 7,694,462 B2 | 4/2010 | O'Callaghan | |
| 7,721,491 B2 | 5/2010 | Appel | |
| 7,748,193 B2 | 7/2010 | Knigge et al. | |
| 7,908,810 B2 | 3/2011 | Payne, Jr. et al. | |
| 7,921,965 B1 | 4/2011 | Surace | |
| 7,941,985 B2 | 5/2011 | Simmons | |
| 7,966,778 B2 | 6/2011 | Klein | |
| 8,051,623 B2 | 11/2011 | Loyd | |
| D652,956 S | 1/2012 | Tanaka et al. | |
| 8,096,084 B2 | 1/2012 | Studebaker et al. | |
| 8,109,058 B2 | 2/2012 | Miller | |
| 8,127,507 B1 | 3/2012 | Bilge | |
| 8,166,716 B2 | 5/2012 | Macdonald et al. | |
| 8,234,827 B1 | 8/2012 | Schroeder, Sr. | |
| 8,234,833 B2 | 8/2012 | Miller | |
| 8,251,175 B1 | 8/2012 | Englert et al. | |
| 8,276,328 B2 | 10/2012 | Pépin | |
| 8,322,086 B2 | 12/2012 | Weber | |
| 8,359,808 B2 | 1/2013 | Stephens, Jr. | |
| 8,424,251 B2 | 4/2013 | Tinianov | |
| 8,490,349 B2 | 7/2013 | Lutzner | |
| 8,505,259 B1 | 8/2013 | Degtyarev | |
| 8,539,732 B2 | 9/2013 | Leahy | |
| 8,555,581 B2 | 10/2013 | Amend | |
| 8,555,589 B2 | 10/2013 | Semmens et al. | |
| 8,555,598 B2 | 10/2013 | Wagner et al. | |
| 8,621,806 B2 | 1/2014 | Studebaker et al. | |
| 8,621,818 B1 | 1/2014 | Glenn et al. | |
| 8,631,616 B2 | 1/2014 | Carrion et al. | |
| 8,733,046 B2 | 5/2014 | Naidoo | |
| 8,769,891 B2 | 7/2014 | Kelly | |
| 8,826,613 B1 | 9/2014 | Chrien | |
| 8,833,025 B2 | 9/2014 | Krause | |

(56) References Cited

U.S. PATENT DOCUMENTS

| | | |
|---|---|---|
| 8,950,132 B2 | 2/2015 | Collins et al. |
| 8,966,845 B1 | 3/2015 | Ciuperca |
| 8,978,324 B2 | 3/2015 | Collins et al. |
| 8,991,111 B1 | 3/2015 | Harkins |
| 8,997,424 B1 | 4/2015 | Miller |
| 9,027,307 B2 | 5/2015 | Collins et al. |
| 9,382,709 B2 | 7/2016 | Collins et al. |
| 9,637,911 B2 | 5/2017 | Doupe et al. |
| 9,683,361 B2 | 6/2017 | Timberlake et al. |
| 10,041,289 B2 | 8/2018 | Collins et al. |
| 10,260,250 B2 | 4/2019 | Collins et al. |
| 10,273,686 B2 | 4/2019 | Lake |
| 10,323,428 B2 | 6/2019 | Collins et al. |
| 10,370,851 B2 | 8/2019 | Bodwell et al. |
| 10,501,929 B2 | 12/2019 | Henry |
| 10,731,330 B2 | 8/2020 | Petricca |
| 2002/0059763 A1 | 5/2002 | Wong |
| 2002/0092703 A1 | 7/2002 | Gelin et al. |
| 2002/0134036 A1 | 9/2002 | Daudet et al. |
| 2002/0170243 A1 | 11/2002 | Don |
| 2002/0184836 A1 | 12/2002 | Takeuchi et al. |
| 2003/0005653 A1 | 1/2003 | Sataka |
| 2003/0056445 A1 | 3/2003 | Cox |
| 2003/0084629 A1 | 5/2003 | Strickland et al. |
| 2003/0101680 A1 | 6/2003 | Lee |
| 2003/0140571 A1 | 7/2003 | Muha et al. |
| 2003/0167712 A1 | 9/2003 | Robertson |
| 2003/0167719 A1 | 9/2003 | Alderman |
| 2003/0200706 A1 | 10/2003 | Kahan et al. |
| 2003/0221381 A1 | 12/2003 | Ting |
| 2004/0065036 A1 | 4/2004 | Capozzo |
| 2004/0103596 A1 | 6/2004 | Don |
| 2004/0221518 A1 | 11/2004 | Westra |
| 2005/0081484 A1 | 4/2005 | Yland |
| 2005/0108957 A1 | 5/2005 | Quesada |
| 2005/0188626 A1 | 9/2005 | Johnson |
| 2005/0188632 A1 | 9/2005 | Rosen |
| 2005/0198919 A1 | 9/2005 | Hester, Jr. |
| 2005/0204697 A1 | 9/2005 | Rue |
| 2005/0204699 A1 | 9/2005 | Rue |
| 2005/0210764 A1 | 9/2005 | Foucher et al. |
| 2005/0210798 A1 | 9/2005 | Burg et al. |
| 2005/0235571 A1 | 10/2005 | Ewing et al. |
| 2005/0235581 A1 | 10/2005 | Cohen |
| 2005/0247013 A1 | 11/2005 | Walpole |
| 2005/0262771 A1 | 12/2005 | Gorman |
| 2006/0021289 A1 | 2/2006 | Elmer |
| 2006/0070321 A1 | 4/2006 | Au |
| 2006/0090326 A1 | 5/2006 | Corbett |
| 2006/0096202 A1 | 5/2006 | Delzotto |
| 2006/0117689 A1 | 6/2006 | Onken et al. |
| 2006/0137293 A1 | 6/2006 | Klein |
| 2006/0143856 A1 | 7/2006 | Rosko et al. |
| 2006/0150521 A1 | 7/2006 | Henry |
| 2006/0179764 A1 | 8/2006 | Ito |
| 2006/0248825 A1 | 11/2006 | Garringer |
| 2006/0277841 A1 | 12/2006 | Majusiak |
| 2007/0000198 A1 | 1/2007 | Payne |
| 2007/0074464 A1 | 4/2007 | Eldridge |
| 2007/0107349 A1 | 5/2007 | Erker |
| 2007/0151196 A1 | 7/2007 | Boatwright |
| 2007/0157539 A1 | 7/2007 | Knigge et al. |
| 2007/0163197 A1 | 7/2007 | Payne et al. |
| 2007/0209306 A1 | 9/2007 | Andrews et al. |
| 2007/0234657 A1 | 10/2007 | Speyer et al. |
| 2007/0251168 A1* | 11/2007 | Turner .................. E04B 2/7457 52/288.1 |
| 2007/0283640 A1 | 12/2007 | Shivak et al. |
| 2007/0294954 A1 | 12/2007 | Barrett |
| 2008/0000177 A1 | 1/2008 | Siu |
| 2008/0057290 A1 | 3/2008 | Guevara et al. |
| 2008/0092472 A1* | 4/2008 | Doerr .................. E04B 1/4178 52/379 |
| 2008/0098676 A1 | 5/2008 | Hutchens |
| 2008/0099283 A1 | 5/2008 | Reigwein |
| 2008/0104901 A1 | 5/2008 | Olvera |
| 2008/0168741 A1 | 7/2008 | Gilgan |
| 2008/0178542 A1 | 7/2008 | Williams |
| 2008/0178642 A1 | 7/2008 | Sanders |
| 2008/0190053 A1* | 8/2008 | Surowiecki ............ H02G 3/083 52/220.8 |
| 2008/0202048 A1 | 8/2008 | Miller et al. |
| 2008/0222981 A1 | 9/2008 | Gobbi |
| 2008/0229669 A1 | 9/2008 | Abdollahzadeh et al. |
| 2008/0245007 A1 | 9/2008 | McDonald |
| 2008/0279620 A1 | 11/2008 | Berg |
| 2008/0282626 A1 | 11/2008 | Powers, Jr. |
| 2008/0289265 A1 | 11/2008 | Lessard |
| 2008/0295443 A1 | 12/2008 | Simmons |
| 2008/0295450 A1 | 12/2008 | Yogev |
| 2009/0031652 A1 | 2/2009 | Ortega Gatalan |
| 2009/0038764 A1 | 2/2009 | Pilz |
| 2009/0064611 A1 | 3/2009 | Hall et al. |
| 2009/0077916 A1 | 3/2009 | Scuderi et al. |
| 2009/0090074 A1 | 4/2009 | Klein |
| 2009/0100760 A1 | 4/2009 | Ewing |
| 2009/0100769 A1 | 4/2009 | Barrett |
| 2009/0100796 A1 | 4/2009 | Denn et al. |
| 2009/0107065 A1 | 4/2009 | LeBlang |
| 2009/0113820 A1 | 5/2009 | Deans |
| 2009/0134287 A1 | 5/2009 | Klosowski |
| 2009/0165399 A1 | 7/2009 | Campos Gines |
| 2009/0188192 A1 | 7/2009 | Studebaker et al. |
| 2009/0188193 A1 | 7/2009 | Studebaker et al. |
| 2009/0205277 A1 | 8/2009 | Gibson |
| 2009/0249714 A1 | 10/2009 | Combs et al. |
| 2009/0277122 A1 | 11/2009 | Howery et al. |
| 2009/0282766 A1 | 11/2009 | Roen |
| 2009/0283359 A1* | 11/2009 | Ravnaas .................. E04B 1/82 181/286 |
| 2009/0293395 A1 | 12/2009 | Porter |
| 2009/0313931 A1 | 12/2009 | Porter |
| 2010/0050556 A1 | 3/2010 | Burns |
| 2010/0058686 A1* | 3/2010 | Henriquez ............... E04B 1/14 52/220.2 |
| 2010/0064590 A1 | 3/2010 | Jones et al. |
| 2010/0064601 A1 | 3/2010 | Napier |
| 2010/0146874 A1 | 6/2010 | Brown |
| 2010/0146893 A1* | 6/2010 | Dickinson ............... E04B 1/70 52/302.3 |
| 2010/0186313 A1 | 7/2010 | Stanford et al. |
| 2010/0212255 A1 | 8/2010 | Lesoine |
| 2010/0218443 A1 | 9/2010 | Studebaker |
| 2010/0229472 A1 | 9/2010 | Malpas |
| 2010/0235206 A1 | 9/2010 | Miller et al. |
| 2010/0263308 A1 | 10/2010 | Olvera |
| 2010/0275544 A1 | 11/2010 | Studebaker et al. |
| 2010/0313518 A1 | 12/2010 | Berg |
| 2010/0325971 A1 | 12/2010 | Leahy |
| 2010/0325989 A1 | 12/2010 | Leahy |
| 2011/0023381 A1 | 2/2011 | Weber |
| 2011/0041411 A1 | 2/2011 | Aragon |
| 2011/0056147 A1 | 3/2011 | Beaudet |
| 2011/0113709 A1 | 5/2011 | Pilz et al. |
| 2011/0113715 A1 | 5/2011 | Tonyan et al. |
| 2011/0126484 A1 | 6/2011 | Carrion et al. |
| 2011/0146180 A1* | 6/2011 | Klein .................. E04B 2/7409 52/317 |
| 2011/0154766 A1 | 6/2011 | Kralic et al. |
| 2011/0162167 A1 | 7/2011 | Blais |
| 2011/0219720 A1 | 9/2011 | Strickland et al. |
| 2011/0247281 A1 | 10/2011 | Pilz et al. |
| 2011/0268916 A1 | 11/2011 | Pardue, Jr. |
| 2011/0296769 A1 | 12/2011 | Collins et al. |
| 2011/0296778 A1 | 12/2011 | Collins et al. |
| 2011/0296789 A1 | 12/2011 | Collins et al. |
| 2011/0300386 A1 | 12/2011 | Pardue, Jr. |
| 2012/0073227 A1 | 3/2012 | Urusoglu |
| 2012/0096800 A1 | 4/2012 | Berg |
| 2012/0137610 A1* | 6/2012 | Knight .................. E04B 2/58 52/309.1 |
| 2012/0151869 A1 | 6/2012 | Miller |
| 2012/0167505 A1 | 7/2012 | Krause |
| 2012/0186174 A1 | 7/2012 | LeBlang |

(56) References Cited

U.S. PATENT DOCUMENTS

| | | |
|---|---|---|
| 2012/0210658 A1 | 8/2012 | Logan |
| 2012/0291378 A1 | 11/2012 | Schroeder et al. |
| 2012/0297712 A1 | 11/2012 | Lutzner et al. |
| 2012/0317923 A1 | 12/2012 | Herdt et al. |
| 2013/0025222 A1 | 1/2013 | Mueller |
| 2013/0025966 A1 | 1/2013 | Nam et al. |
| 2013/0036688 A1 | 2/2013 | Gosain |
| 2013/0067832 A1 | 3/2013 | Collins et al. |
| 2013/0111840 A1 | 5/2013 | Bordener |
| 2013/0133277 A1 | 5/2013 | Lewis |
| 2013/0232887 A1 | 9/2013 | Donnini |
| 2014/0013678 A1 | 1/2014 | Deverini |
| 2014/0013684 A1 | 1/2014 | Kelly et al. |
| 2014/0013695 A1 | 1/2014 | Wolynski et al. |
| 2014/0047780 A1 | 2/2014 | Quinn et al. |
| 2014/0059960 A1 | 3/2014 | Cole |
| 2014/0069035 A1 | 3/2014 | Collins |
| 2014/0069040 A1 | 3/2014 | Gibson |
| 2014/0069050 A1 | 3/2014 | Bolin |
| 2014/0083046 A1 | 3/2014 | Yang |
| 2014/0090323 A1 | 4/2014 | Glancy |
| 2014/0130441 A1 | 5/2014 | Sugihara et al. |
| 2014/0317841 A1 | 10/2014 | Dejesus et al. |
| 2014/0338280 A1 | 11/2014 | Tanaka et al. |
| 2015/0007415 A1 | 1/2015 | Kalinowski |
| 2015/0093184 A1 | 4/2015 | Henry |
| 2015/0096251 A1 | 4/2015 | McCandless et al. |
| 2015/0121797 A1 | 5/2015 | Brown et al. |
| 2015/0128518 A1 * | 5/2015 | Knight ............... E04F 13/0864 52/404.1 |
| 2015/0136361 A1 | 5/2015 | Gregory |
| 2015/0152634 A1 | 6/2015 | Unger |
| 2015/0211227 A1 | 7/2015 | Collins et al. |
| 2015/0233108 A1 | 8/2015 | Eggleston, II et al. |
| 2015/0252558 A1 | 9/2015 | Chin |
| 2015/0284950 A1 | 10/2015 | Stramandinoli |
| 2015/0297926 A1 | 10/2015 | Dzegan |
| 2015/0308096 A1 | 10/2015 | Merhi et al. |
| 2016/0002912 A1 | 1/2016 | Doupe et al. |
| 2016/0053475 A1 | 2/2016 | Locker et al. |
| 2016/0122996 A1 | 5/2016 | Timberlake et al. |
| 2016/0145933 A1 | 5/2016 | Condon et al. |
| 2016/0258160 A1 | 9/2016 | Radhouane et al. |
| 2016/0290030 A1 | 10/2016 | Collins et al. |
| 2016/0319534 A1 | 11/2016 | Bernardo |
| 2017/0037613 A1 | 2/2017 | Collins et al. |
| 2017/0284095 A1 | 10/2017 | Collins et al. |
| 2017/0299198 A1 | 10/2017 | Collins et al. |
| 2017/0306624 A1 | 10/2017 | Graham et al. |
| 2017/0306625 A1 | 10/2017 | Collins et al. |
| 2017/0342735 A1 | 11/2017 | Collins et al. |
| 2018/0038103 A1 | 2/2018 | Neumayr |
| 2018/0148926 A1 | 5/2018 | Lake |
| 2018/0209136 A1 | 7/2018 | Aylward et al. |
| 2018/0223521 A1 | 8/2018 | Uno et al. |
| 2018/0328056 A1 | 11/2018 | Collins et al. |
| 2019/0032327 A1 | 3/2019 | Musson |
| 2019/0119908 A1 | 4/2019 | Petricca |
| 2019/0136508 A1 | 5/2019 | Chaillan |
| 2019/0249409 A1 | 8/2019 | Boyd et al. |
| 2020/0224407 A1 | 7/2020 | Ng |

FOREIGN PATENT DOCUMENTS

| | | | |
|---|---|---|---|
| CN | 1313921 | 9/2001 | |
| CN | 1234087 | 11/2002 | |
| CN | 1742144 | 3/2006 | |
| CN | 20137279 | 3/2008 | |
| CN | 101426986 | 5/2009 | |
| CN | 101821462 | 9/2010 | |
| CN | 101831963 | 9/2010 | |
| CN | 102105642 | 6/2011 | |
| CN | 201952944 | 8/2011 | |
| CN | 202117202 | 1/2012 | |
| CN | 102459775 | 5/2012 | |
| CN | 102587693 | 7/2012 | |
| CN | 202299241 | 7/2012 | |
| CN | 202391078 | 8/2012 | |
| CN | 102733511 | 10/2012 | |
| CN | 205024886 | 2/2016 | |
| CN | 108487464 | 9/2018 | |
| DE | 4205812 | 9/1993 | |
| DE | 9419429 | 2/1995 | |
| DE | 20002775 | 8/2000 | |
| DE | 19918153 | 11/2000 | |
| DE | 20315506 | 11/2004 | |
| DE | 202008007139 | 10/2009 | |
| EP | 0612896 A1 * | 8/1994 | ............. E04C 2/292 |
| EP | 1045078 | 10/2000 | |
| EP | 0235029 | 2/2002 | |
| EP | 1375804 | 1/2004 | |
| EP | 1568828 | 8/2005 | |
| EP | 2128353 | 12/2009 | |
| EP | 2213808 | 8/2010 | |
| EP | 2238872 | 10/2010 | |
| EP | 1739246 | 1/2011 | |
| EP | 2281964 | 2/2011 | |
| EP | 3133220 | 2/2017 | |
| FR | 1317681 | 5/1963 | |
| FR | 2988749 | 10/2013 | |
| FR | 2765906 | 1/2019 | |
| GB | 898905 | 6/1962 | |
| GB | 2481126 | 12/2011 | |
| JP | S46-006980 | 12/1971 | |
| JP | S49-104111 | 9/1974 | |
| JP | 52-015934 | 4/1977 | |
| JP | 53-000014 | 1/1978 | |
| JP | 53-156364 | 12/1978 | |
| JP | 54-084112 | 6/1979 | |
| JP | S54-145910 | 11/1979 | |
| JP | 56-131749 | 10/1981 | |
| JP | 57-158451 | 9/1982 | |
| JP | S59-065126 | 5/1984 | |
| JP | S60-019606 | 2/1985 | |
| JP | 61-144151 | 9/1986 | |
| JP | S61-201407 | 12/1986 | |
| JP | S6358035 | 3/1988 | |
| JP | H01-153013 | 10/1989 | |
| JP | H0130985 | 1/1991 | |
| JP | H0310985 | 1/1991 | |
| JP | H049373 | 3/1992 | |
| JP | 6-12178 | 2/1994 | |
| JP | 06-212721 | 8/1994 | |
| JP | H06-220932 | 8/1994 | |
| JP | 07-052887 | 6/1995 | |
| JP | H07-173893 | 7/1995 | |
| JP | 8-189078 | 7/1996 | |
| JP | H08-189078 | 7/1996 | |
| JP | H09-228510 | 9/1997 | |
| JP | 2576409 Y2 | 7/1998 | |
| JP | 10234493 | 9/1998 | |
| JP | 11-117429 | 4/1999 | |
| JP | H11-100926 | 4/1999 | |
| JP | 2000-34801 | 2/2000 | |
| JP | 2000144997 | 5/2000 | |
| JP | 2000-160861 | 6/2000 | |
| JP | 3257111 | 2/2002 | |
| JP | 2002-309691 | 10/2002 | |
| JP | 2002536615 | 10/2002 | |
| JP | 2002364104 | 12/2002 | |
| JP | 2003-505624 | 2/2003 | |
| JP | 2003-278300 | 10/2003 | |
| JP | 2003-293493 | 10/2003 | |
| JP | 2004108031 | 4/2004 | |
| JP | 2004-344194 | 12/2004 | |
| JP | 3664280 | 6/2005 | |
| JP | 2006-161406 | 6/2006 | |
| JP | 3940621 | 7/2007 | |
| JP | 3137760 | 12/2007 | |
| JP | 2008-063753 | 3/2008 | |
| JP | 2008073434 | 4/2008 | |
| JP | 2008110104 | 5/2008 | |
| JP | 2009-257713 | 11/2009 | |

(56) References Cited

FOREIGN PATENT DOCUMENTS

| | | |
|---|---|---|
| JP | 2010-185264 | 8/2010 |
| JP | 2010185264 | 8/2010 |
| JP | 2010245918 | 10/2010 |
| JP | 2011032802 | 2/2011 |
| JP | 3187449 | 11/2013 |
| JP | 2015-117502 | 6/2015 |
| KR | 1019990052255 | 7/1999 |
| KR | 1019990053902 | 7/1999 |
| KR | 100236196 | 12/1999 |
| KR | 102000200413000 | 10/2000 |
| KR | 20060066931 | 6/2006 |
| KR | 20080003326 | 8/2008 |
| KR | 20-2008-0003326 | 7/2012 |
| KR | 101481790 | 1/2015 |
| KR | 20180092677 | 8/2018 |
| WO | 1991007557 | 5/1991 |
| WO | 1997022770 | 6/1997 |
| WO | 200046457 | 8/2000 |
| WO | 0058583 | 10/2000 |
| WO | 2002035029 | 5/2002 |
| WO | 2006091864 | 8/2006 |
| WO | 2007059003 | 5/2007 |
| WO | 2007080561 | 7/2007 |
| WO | 2010030060 | 3/2010 |
| WO | 2010037938 | 4/2010 |
| WO | 2011015681 | 2/2011 |
| WO | 2015050502 | 4/2015 |
| WO | 2016/032537 | 3/2016 |
| WO | 2016032538 | 3/2016 |
| WO | 2016032539 | 3/2016 |
| WO | 2016032540 | 3/2016 |
| WO | 2016033429 | 3/2016 |
| WO | 2016033525 | 3/2016 |

OTHER PUBLICATIONS

EPO, Extended European Search Report for European Patent Application No. 17763914.3, dated Nov. 19, 2019, 10 pages.
EPO, Extended European Search Report for European Patent Application No. 17763913.5, dated Oct. 16, 2019, 8 pages.
EPO, Partial European Search Report for European Patent Application No. 17763910.1, dated Oct. 17, 2019, 16 pages
EPO, Extended European Search Report for European Patent Application No. 17763907.7, dated Sep. 13, 2019, 13 pages
Written Opinion for Singapore Patent Application No. 11201807196R, dated Nov. 18, 2019, 12 pages
WIPO, "International Search Report and Written Opinion for PCT Application No. PCT/US2019/038557", dated Sep. 4, 2019, 67 pages.
EPO, Extended European Search Report for European Patent Application No. 17763910.1, dated Jan. 28, 2020, 13 pages.
U.S. Appl. No. 12/796,603, filed Jun. 8, 2010, Collins et al.
European Search Report in PCT/US2015/047383 dated Jun. 22, 2018, 10 Pages.
WIPO, International Search Report and Written opinion for International Application No. PCT/US/2014/053614 dated Dec. 18, 2014, 11 pages.
WIPO, International Search Report and Written opinion for International Application No. PCT/US/2014/053615 dated Dec. 17, 2014, 11 pages.
WIPO, International Search Report and Written opinion for International Application No. PCT/US/2014/053613 dated Dec. 18, 2014, 13 Pages.
WIPO, International Search Report and Written Opinion for International Application No. PCT/US2011/001039 dated Oct. 5, 2011, 14 Pages.
WIPO, International Search Report and Written opinion for International Application No. PCT/US2015/047383 dated Jan. 12, 2016, 14 Pages.
WIPO, International Search Report and Written opinion for International Application No. PCT/US15/47536 dated Dec. 4, 2015, 17 Pages.
EPO, European Search Report received for POT 14891125.8-1604/3011122 dated Jul. 8, 2016, 4 pages.
WIPO, International Search Report and Written opinion for International Application No. PCT/US/2014/053616 dated Dec. 17, 2014, 9 Pages.
WIPO, International Search Report and Written Opinion for PCT Application No. PCT/US2011/001039 dated Oct. 5, 2011, 9 Pages.
"Beam to column connection", TATA Steel, http://www.tatasteelconstruction.com/en/reference/teaching_resources/architectural_studio_reference/elements/connections/beam to column connections, 2014, 4 Pages.
"Emerging Trends 2012 Executive Summary", Urban Land Institute, Ch. 1, 2011, 1-11 Pages.
"Emerging Trends in real estate", accessed on Sep. 15, 2016 at https://web.archive.orglweb120140813084823/http://pwc.corn.au/industry/real-estate/assets/Real-Estate-2012-Europe-Jan12.pdf, pp. 60, 2012.
EPO, "Extended European Search Report for European Application No. EP 15836516.3", dated Jun. 22, 2018, 1 page.
EPO, "Extended European Search Report for European Patent Application No. 14900469", dated Mar. 20, 2018, 1-8 pages.
"How to Soundproof a Ceiling—Soundproofing Ceilings", http://www.soundproofingcompany.com/soundproofing-solutions/soundproof-a-ceiling/, Apr. 2, 2014, 1-7 Pages.
"Insulspan Installation Guide", Obtained at: http://www.insuispan.comidownloads:InstallationGuide,pdf on Feb. 2, 2016, 58 pages.
"Structural Insulated Panel", Wikipedia, http://www.en.wikipedia.org//wiki/Structural_insulated_panel, May 30, 2014, 5 Pages.
"Structural Insulated Panels", SIP Solutions, http://www.sipsolutions.com/content/structuralinsulated-panels, Aug. 15, 2014, 3 pages
"US Apartment & Condominium Construction Forecast 2003-2017", Statista, Inc., Jun. 2012, 8 Pages.
Azari, et al., "Modular Prefabricated Residential Construction—Constraints and Opportunities", PNCCRE Technical Report #TR002, Aug. 2013, 90 Pages.
Borzouie, Jamaledin, et al., "Seismic Assesment and Reahbilitation of Diaphragms", http://www.nosazimadares.ir/behsazi/15WCEE2012/URM/1/Roof.pdf, Dec. 31, 2011, 86 Pages.
EPO, Communication Pursuant to Article 94(3) EPC mailed for EP application No. 15836516.3, dated Apr. 25, 2019, 4 pages.
EPO, Communication Pursuant to Article 94(3) EPC for European Patent Application No. 15836516.3, dated Aug. 2, 2019, 4 pages.
EPO, Communication Pursuant to Article 94(3) EPC mailed for European patent application No. 14900469.9, dated Jun. 18, 2019, 5 pages.
FRAMECAD, "FC EW 1-12mm Fibre Cement Sheet + 9mm MgO Board Wall Assembly", 2013, 2 pages.
Giles, et al., "Innovations in the Development of Industrially Designed and Manufactured Modular Concepts for Low-Energy, Multi-Story, High Density, Prefabricated Affordable Housing", Innovations in the Development of Industrially Designed and Manufactured Modular Concepts, 2006, 1-15 Pages.
Gonchar, "Paradigm Shift—Multistory Modular", Architectural Record, Oct. 2012, 144-148 Pages.
Kerin, et al., "National Apartment Market Report—2013", Marcus & Millichap, 2013, 1-9 pages.
M.A. Riusillo, "Lift Slab Construction: Its History, Methodology, Economics and Applications", ACI-Abstract, Jun. 1, 1988, 2 pages.
McIlwain, "Housing in America—The Next Decade", Urban Land Institute, 2010, 1-28 Pages.
McIlwain, "The Rental Boost From Green Design", Urban Land, http://urbanland.uli.org/sustainability/the-rental-boost-from-green-design/, Jan. 4, 2012, 1-6 Pages.
Shashaty, Andre, "Housing Demand", Sustainable Communities, Apr. 2011, 14-18 Pages.
Sichelman, "Severe Apartment Shortage Looms", Urban Land, http://urbanland.uli.org/capital-markets/nahb-orlando-severe-apartment shortage-looms/, Jan. 13, 2011, 1-2 Pages.
Stiemer, S F, "Bolted Beam-Column Connections", http://faculty.philau.edu/pastorec/Tensile/bolted_beam_column_connections.pdf, Nov. 11, 2007, 1-16 Pages.
WIPO, International Search Report for International Patent Application No. PCT/US2017/021168, dated May 19, 2017, 5 pages.

(56) References Cited

OTHER PUBLICATIONS

WIPO, International Search Report for International Patent Application No. PCT/US2017/021179, dated May 25, 2017, 7 pages.
WIPO, Written Opinion for International Patent Application No. PCT/US2017/021179, dated May 25, 2017, 7 pages.
WIPO, International Search Report of International Patent Application No. PCT/US2017/021177, dated Jun. 5, 2017, 8 pages.
WIPO, Written Opinion of International Patent Application No. PCT/US2017/021177, dated Jun. 5, 2017, 8 pages.
WIPO, Written Opinion for International Patent Application No. PCT/US2017/021168, dated May 19, 2017, 8 pages.
WIPO, International Search Report and Written Opinion mailed for International application No. PCT/US2014/053614 dated Dec. 18, 2014, 11 pages.
WIPO, International Search Report and Written Opinion mailed for International application No. PCT/US2014/053615 dated Dec. 17, 2014, 11 Pages.
WIPO, International Search Report and Written Opinion mailed for International application No. PCT/US2019/031370, dated Aug. 7, 2019, 11 pages.
WIPO, International Search Report and Written Opinion mailed for International application No. PCT/US2014/053613 dated Dec. 18, 2014, 13 pages.
WIPO, International Search Report and Written Opinion mailed for International application No. PCT/US2015/047536 dated Dec. 4, 2015, 17 Pages
WIPO, International Search Report and Written Opinion mailed for International application No. PCT/US2014/053616 dated Dec. 17, 2014, 9 Pages
USPTO, International Search Report for International Patent Application No. PCT/US2017/021174, dated Jun. 26, 2017, 11 pages.
USPTO, Written Opinion for International Patent Application No. PCT/US2017/021174, dated Jun. 26, 2017, 6 pages.

* cited by examiner

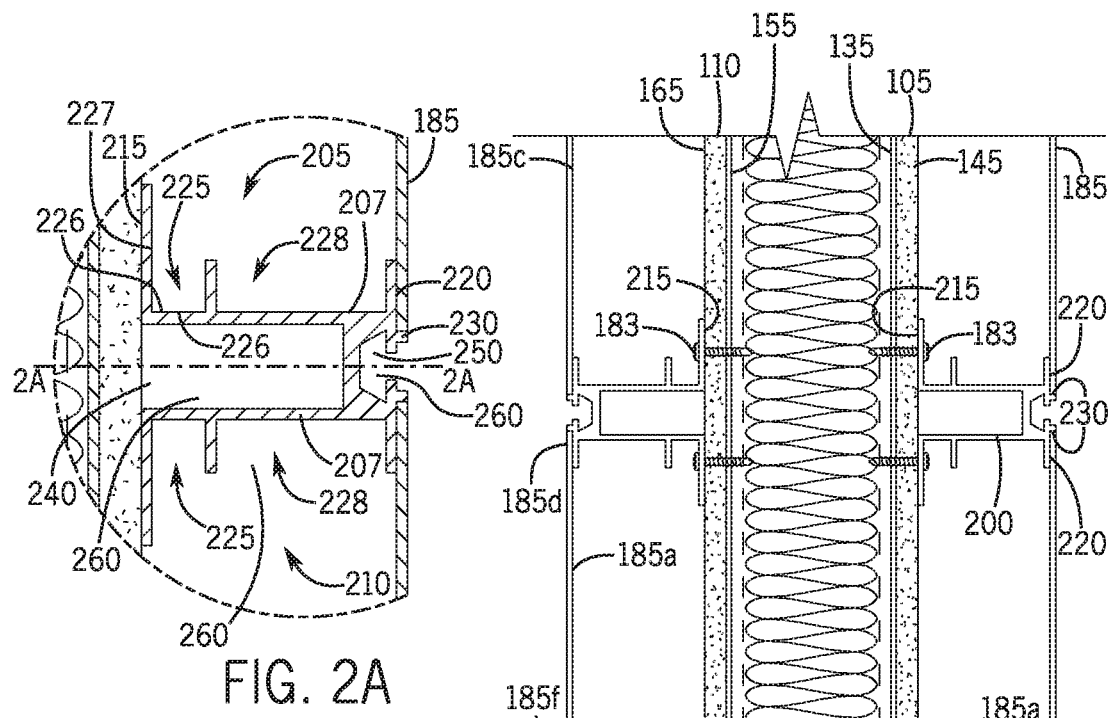
FIG. 2A
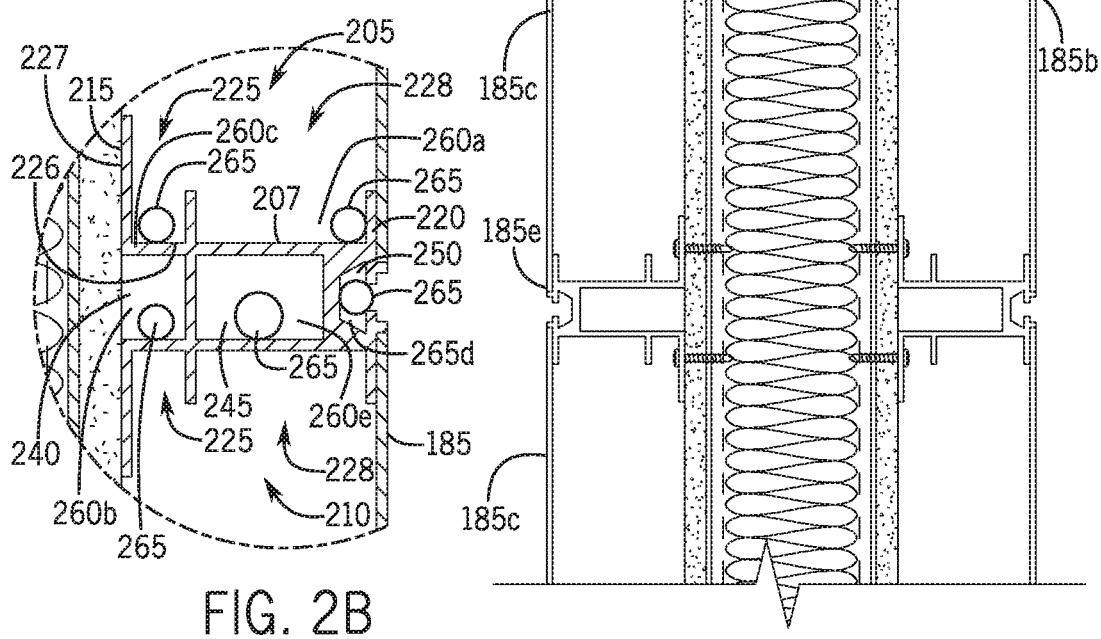
FIG. 2B
FIG. 3

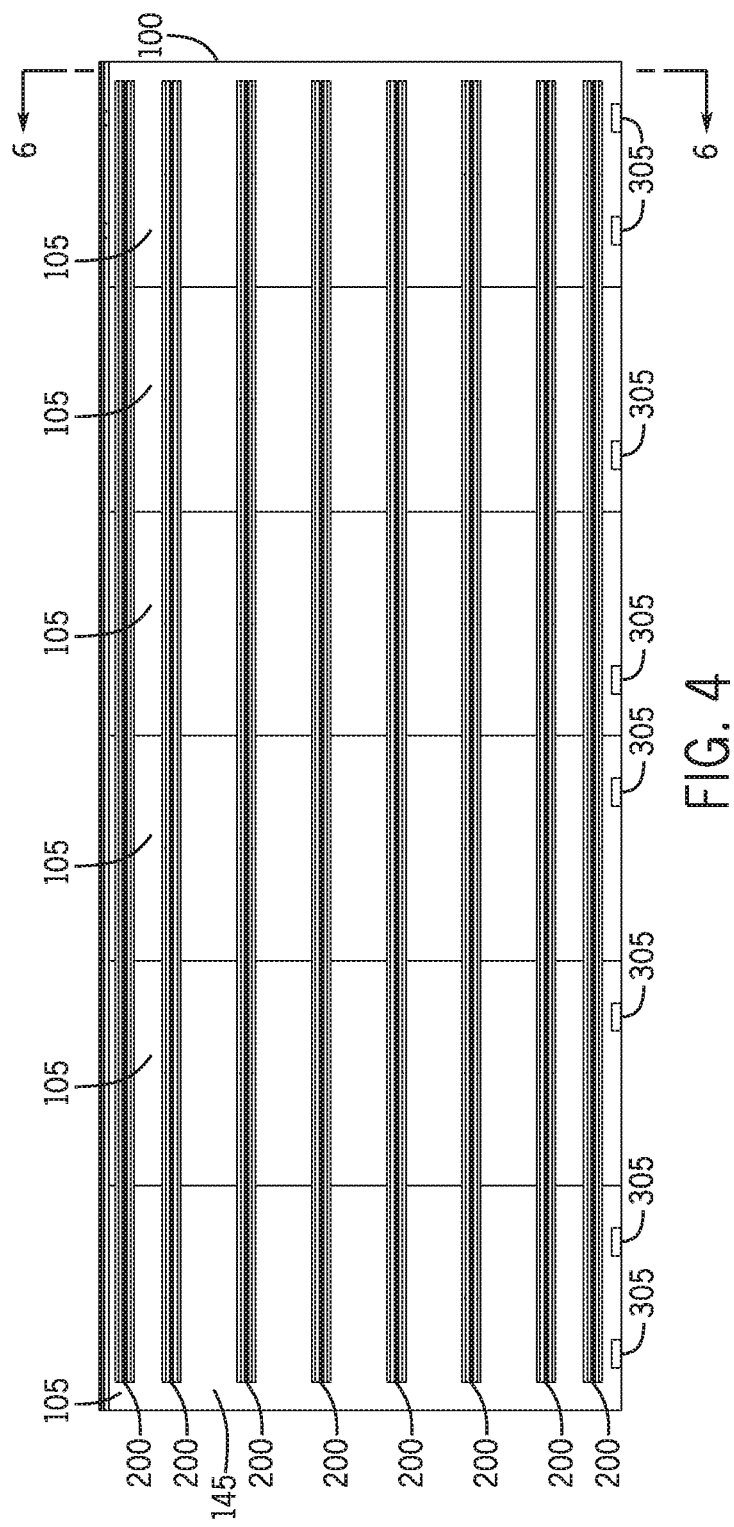
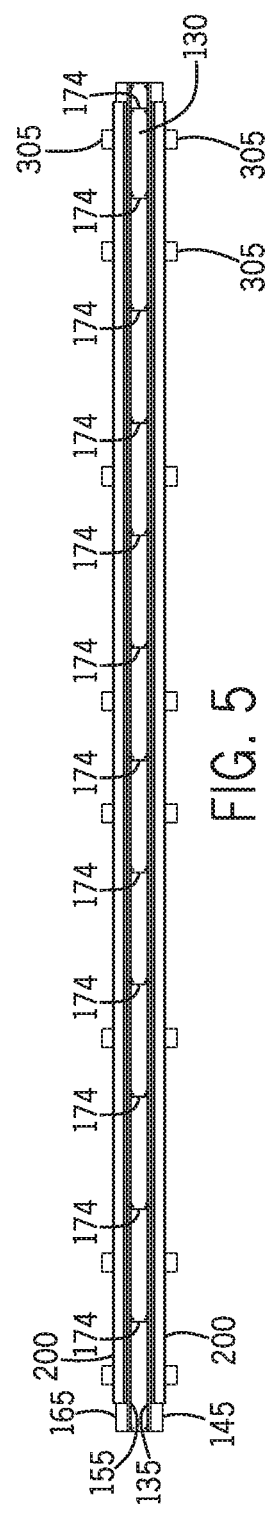
FIG. 4
FIG. 5

PREFABRICATED DEMISING WALL WITH EXTERNAL CONDUIT ENGAGEMENT FEATURES

CROSS-REFERENCE TO RELATED APPLICATION

The present application is a U.S. National Stage filing under 35 U.S.C. § 371 of International Patent Application No. PCT/US2017/021174, filed on Mar. 7, 2017, which is a non-provisional of and claims priority under 35 U.S.C. § 119(e) to U.S. Provisional Patent Application No. 62/304,868, filed on Mar. 7, 2016, both of which are incorporated by reference, in their entirety, for any purpose.

BACKGROUND

Building design and construction is the last large industry in the world where the products (office building, shopping malls, apartments, etc.) are built by hand. The people who design the buildings (architects and engineers) are typically separate from the people who construct the buildings (contractors) for liability reasons. Architects do not want the liability of how the building is built, and conversely, contractors do not want the liability of how the building is drawn and engineered. Furthermore, buildings are constructed by people with specific trade skills, deployed in a linear sequence and buildings are typically built by hand outside in the elements. Therefore, conventional construction is more of a process than a product, resulting in a great deal of waste and inefficiency.

SUMMARY

This disclosure relates generally to modular building construction components and more specifically to methods and apparatus for a demising wall assembly and methods of installation thereof. In an example, a prefabricated demising wall assembly comprises two substrate panels each with an interior and exterior surface. The substrate panels may be configured to span between a floor and a ceiling of a building unit. The walls may comprise a plurality of metal studs that connect the interior surfaces of the two substrate panels, wherein the plurality of metal studs define a space between the substrate panels. The wall may comprise a fire sprinkler pipeline between the two substrate panels, wherein at least some of the plurality of metal studs have an aperture accommodating the fire sprinkler pipeline through an interior of the demising wall assembly. A plurality of hanger elements may be operably attached to the exterior surfaces of the two substrate panels, and the plurality of hanger elements may be configured to connect to a plurality of removable finish panels.

Some example embodiments include methods of assembling a prefabricated demising wall in a building. In some examples, a method may include placing a demising wall assembly over a first beam of a structural frame of a building, the demising wall assembly including two wall substrate panels and metal studs connecting interior surfaces of the wall substrate panels. A lower portion of the demising wall assembly may then be attached to the structural frame using angle brackets attached to opposite sides of the demising wall assembly. An upper portion of the demising wall may then be connected to an upper floor and ceiling panel using a compensating track movably connected to the metal studs.

An example method of assembling a prefabricated demising wall assembly at a site distant from a building site may also be disclosed. The method may include attaching a plurality of non-combustible boards to a frame comprising a plurality of metal studs that forms two wall substrate panels of a demising wall panel separated by a space therebetween. Each of the two wall substrate panels may have an interior and exterior surface, and the wall substrate panels may be configured to span between a floor and a ceiling of a building unit. The interior surfaces of each of a plurality of hanger elements may be attached to the exterior surfaces of at least one of the two wall substrate panels. Conduit configured for the routing of electrical wire may then be installed to or proximate to at least one of the plurality of hanger elements, and electrical wire may then be installed into the conduit configured for routing the electrical wire. A plurality of finish panels may then be removably installed to the plurality of hanger elements.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2A is a partial schematic illustration of the demising wall assembly of FIG. 1 taken along line 2-2;

FIG. 2B is a partial sectional front elevation schematic illustration of an alternate embodiment demising wall assembly;

FIG. 3 is a partial sectional front elevation schematic illustration of an embodiment demising wall assembly;

FIG. 4 is a right side elevation schematic illustration of an embodiment demising wall assembly;

FIG. 5 is a top plan schematic illustration of the demising wall assembly of FIG. 4;

Figure 1:
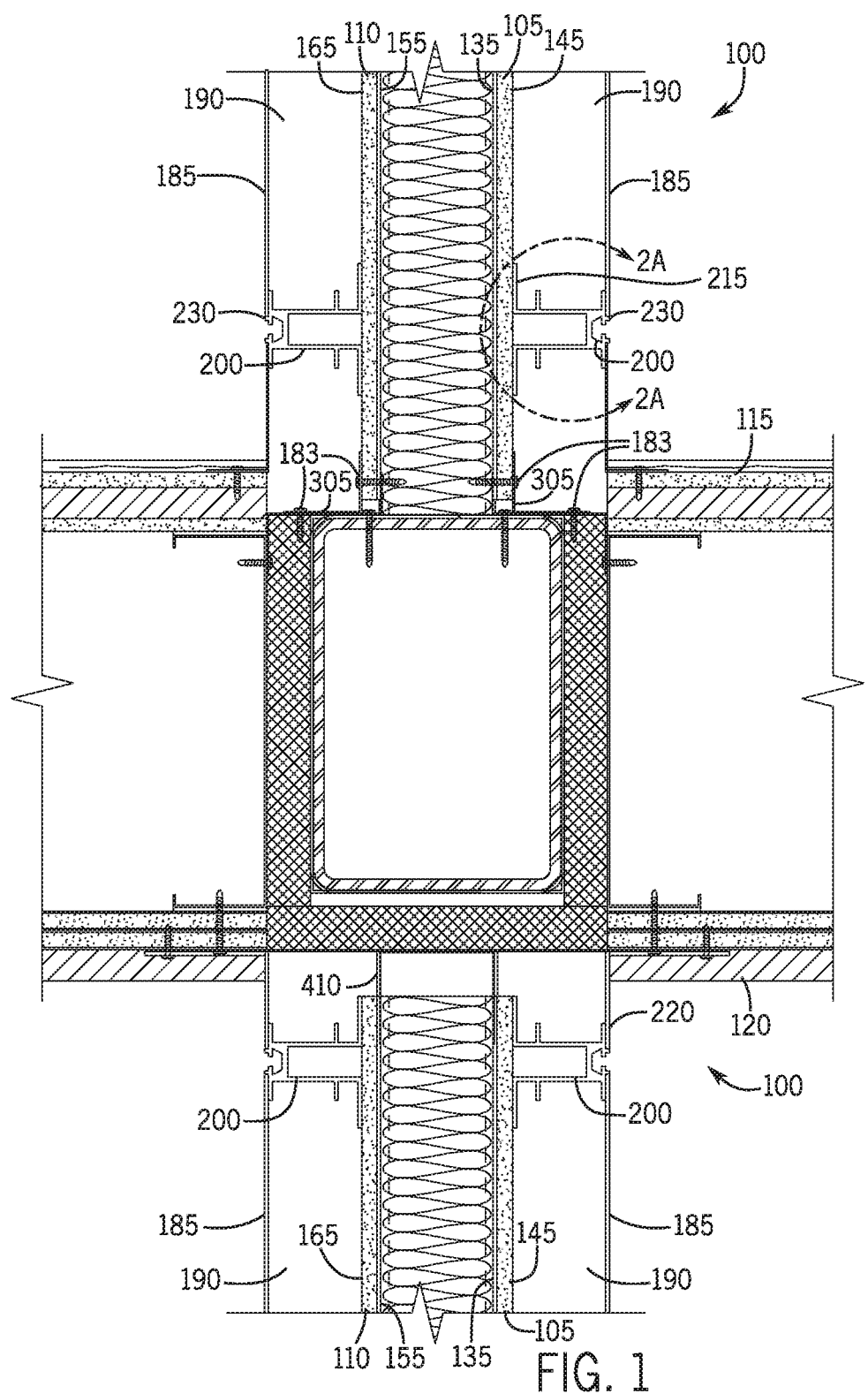
FIG. 1 is a partial sectional front elevation schematic illustration of an embodiment demising wall assembly at a floor and ceiling interface.

all arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspect of the present disclosure, as generally described herein, and illustrated in the Figures can be arranged, substituted, combined, separated, and designed in a wide variety of different configuration, all of which are implicitly contemplated herein.

This disclosure is drawn, inter alia, to methods, systems, products, devices, and/or apparatus generally related to a prefabricated demising wall assembly comprising two substrate panels each with an interior and exterior surface. The substrate panels are configured to span between a floor and a ceiling of a building unit. The walls may comprise a plurality of metal studs that connect the interior surfaces of the two substrate panels, wherein the plurality of metal studs define a space between the substrate panels. The wall may comprise a fire sprinkler pipeline between the two substrate panels, wherein at least some of the plurality of metal studs have an aperture accommodating the fire sprinkler pipeline through an interior of the demising wall assembly. A plurality of hanger elements may be operably attached to the exterior surfaces of the two substrate panels, wherein the plurality of hanger elements may be configured to connect to a plurality of removable finish panels.

The demising wall assembly may be a sub-assembly that may solve and/or alleviate the following problems in midrise and high rise residential projects: (a) costly and time consuming in-field construction of demising (or separation) walls between units; (b) providing acoustical separation between units; (c) waterproofing, energy and thermal separation in between units; and (d) providing interior finishes for a portion of the living space. The demising wall assembly may meet and/or contribute to meeting: fire protection and codes; acoustical rating for ambient noise transfer; energy rating; tolerances for connecting to other wall panels; thermal and moisture protection. It is to be understood that not all embodiments may solve and/or alleviate all, or even any, of the above described problems, and the problems are provided to facilitate appreciation of aspects of some embodiments described herein.

Demising wall assemblies may be fully integrated sub-assemblies that include 9'×22' non-combustible substrate panels interiorly connected by metal studs, wherein the substrate panels are exteriorly connected to horizontal hanger elements, and wherein the hanger elements are configured for exteriorly connecting to finish panels.

FIG. 1 is a partial sectional front elevation schematic illustration of an embodiment demising wall assembly at a floor and ceiling interface in accordance with at least some embodiments described herein. FIG. 1 shows a demising wall assembly 100; two substrate panels 105, 110 with an interior surface 135, 155 and an exterior surface 145, 165; a floor 115; a ceiling 120; a space 130 between the substrate panels 105, 110; a plurality of hanger elements 200 with an interior surface 215; a finish panel retaining feature 230; sound insulation 190; a plurality of individual finish panels 185; a plurality of angle brackets 305; a compensating track 410; and fasteners 183. The various components described in FIG. 1 are merely examples, and other variations, including eliminating components, combining components, and substituting components are all contemplated.

An example embodiment may include a demising wall assembly 100 with two substrate panels 105, 110, each of the substrate panels 105, 110 configured to span between a floor 115 and a ceiling 120 of a building unit. The two substrate panels 105, 110 have a space 130 between them. The first substrate panel 105 includes an interior surface 135 and an exterior surface 145. The first substrate panel 105 may be a non-combustible material such as a magnesium oxide (MgO) board or other lightweight, waterproof, non-combustible material. The second substrate panel 110 includes an interior surface 155 and an exterior surface 165. The second substrate panel 110 may be a non-combustible material such as magnesium oxide (MgO) board or other lightweight, waterproof, non-combustible material. The substrate panels 105, 110 may be attached to a plurality of studs with their interior surface facing one another. Angle brackets 305 may be attached (e.g., mechanically fastened using fasteners 183) to the demising wall assembly 100, for example to the substrate panels 105, 110 and may be used to attach the demising wall assembly 100 to the floor 115. A compensating channel 410 may be provided at a top portion of the demising wall assembly 100 when joining the demising wall assembly 100 to the ceiling 120. The compensating channel 410 may be movably connected to the lower portion of the demising wall assembly 100, which may reduce transfer of loads from structure above the demising wall assembly 100 to the lower portion of the demising wall assembly 100.

The demising wall 100 may also include a plurality of hanger elements 200 that may be arranged generally horizontally along one or more of the substrate panels. The hanger elements 200 may have a length that is equal to the majority of the length of the demising wall assembly 100 or the full length of the demising wall assembly 100. In some examples, the hanger elements 200 may be implemented in the form of a continuous bracket which extends substantially the full length of the demising wall assembly 100. In some examples, the hanger elements 200 may only span a portion of the length of the demising wall assembly 100. In further examples, the hanger elements 200 may be implemented as a plurality of separate shorter brackets that are arranged at intermittent locations along the length of the demising wall assembly. Other variations or combinations may be used.

An interior surface 215 of a hanger element 200 may be attached to an exterior surface (e.g., surface 145, or 165) of a substrate panel (e.g., substrate panel 105, or 110), for example using fasteners (not pictured). One or more finish panels 185 may be adjacent to both the first exterior surface 220 and the finish panel retaining feature 230 of the hanger element 200. The hanger elements 200 may be configured to provide the finish panels in a spaced relation with respect to the exterior surfaces 145, 165 of the substrate panels 105, 110, such as to accommodate additional components (e.g., electrical wire, insulation) therebetween. In this regard, the hanger elements 200 may interchangeably be referred to as spacer elements.

In certain embodiments, the angle brackets 305 may be attached to the floor 115 by fasteners 183. The angle brackets 305 may be used to provide alignment of the bottom edge of the demising wall assembly 100 during the installation of the demising wall assembly 100 and also used to then attach the demising wall assembly 100 to the floor 115 or components of the floor 115.

In some examples, sound insulation 190 may be provided within the space defined between the finish panels 185 and the exterior surfaces 145, 165 of the substrate panels 105, 110. In some examples, sound insulation 190 may be installed above and below a hanger element 200 and between the finish panel 185 and the exterior surface 150 of the first substrate panel 105, and also installed above and below an hanger element 200 and between the finish panel 185 and the exterior surface 165 of the second substrate panel 110. In some examples, the sound insulation 190 may occupy only a portion of the space between the finish panels 185 and the exterior surfaces 145, 165 of the substrate panels 105, 110. In some examples, additional components, such as electrical conduits and/or air ducts may be provided in the space between the finish panels 185 and the exterior surfaces 145, 165 of the substrate panels 105, 110.

FIG. 2A is a partial schematic illustration of the demising wall assembly of FIG. 1 taken along line 2-2 in accordance with at least some embodiments described herein. FIG. 2A shows a hanger element 200 with an upper section 205; a lower section 210; an interior surface 215; a first exterior surface 220; a U shaped channel 225 with a width 226 and an interior surface 227; a U-shaped channel 228; a finish panel retaining feature 230; an interior aperture 240; an exterior aperture 250; a plurality of conduit engagement features 260; and at least one finish panel 185. The various components described in FIG. 2 are merely examples, and other variations, including eliminating components, combining components, and substituting components are all contemplated.

An embodiment of the hanger element 200 may be symmetrical about a horizontal plane 2A, such that an upper section 205 is a mirror image of a lower section 210. This may allow a hanger element 200 to be used with greater versatility as it can be mounted in various configurations. In an example embodiment, the hanger element 200 may be manufactured from a plastic, fiber reinforced plastic or other composite materials such as a fiber reinforced resin. The hanger element 200 may be manufacturing as a pultrusion or extrusion technique, various composite manufacturing techniques, molding, casting, machining, or other techniques. In some embodiments, the hanger element 200 may be manufactured as an extruded metal (e.g., aluminum, steel, iron, or an alloy) member.

As shown in FIG. 2A, both the upper 205 and lower 210 sections of the hanger element 200 have an interior surface 215 and a first exterior surface 220. Both the upper 205 and lower 210 sections of the hanger element 200 may further comprise a U shaped channel 225 with a width 226 and an interior surface 227. The first exterior surface 220 of each section 205, 210 may be adjacent to a finish panel retaining feature 230. As described below with reference to FIG. 4, the finish panel retaining feature 230 may have a continuous length along the entire length of the hanger element 200, or in an alternate embodiment, it may be broken up intermittently by a vertical rod retaining feature (not pictured).

The hanger element 200 may have an interior aperture 240 and an exterior aperture 250. The apertures 240, 250 may act as or further include conduit engagement features 260 such that a conduit 265 (not pictured) may be placed throughout the horizontal length of the hanger element 200. (This embodiment is described below with reference to FIG. 9.) Furthermore, the horizontal surface 207 of either the upper section 205 or the lower section 210 may act as conduit engagement feature 260 such that conduit 265 (not pictured) may be placed adjacent the horizontal length of the hanger element 200. (This embodiment is described below with reference to FIG. 9.) In some embodiments, the conduit engagement feature 260 may be integrally formed with the hanger element 200. In some embodiments, the conduit engagement feature may be connected to the hanger element 200.

FIG. 2B is a partial sectional front elevation schematic illustration of an alternate embodiment demising wall assembly in accordance with at least some embodiments described herein. FIG. 2B shows a hanger element 200 with an upper section 205; a lower section 210; a U-channel 225 with an interior surface 227; a U-channel 228 with an interior surface 207; an interior aperture 240; an intermediate aperture 245; an exterior aperture 250; a conduit engagement feature 260, 260a, 260b, 260c, 260d; 260e; conduit 265; and at least one finish panel 185. The various components described in FIG. 2B are merely examples, and other variations, including eliminating components, combining components, and substituting components are all contemplated.

The hanger element 200 of FIG. 2B may be similar to that of the hanger element 200 in FIG. 2A, with some structural differences. For example, the hanger element 200 of FIG. 2B may have an intermediate aperture 245 in addition to an interior aperture 240 and an exterior aperture 250. The apertures 240, 245, and 250 may act as or further include conduit engagement features 260 such that a conduit 265 may be placed throughout the horizontal length of the hanger element 200.

As shown in FIG. 2B, both the upper 205 and lower 210 sections of the hanger element 200 have an interior surface 215 and a first exterior surface 220. Both the upper 205 and lower 210 sections of the hanger element 200 may feature a conduit engagement feature 260 such that conduit 265 may be mounted in a variety of locations the length of the demising wall assembly. In one embodiment, the conduit engagement feature 260c is located on an interior surface 227 of a U-shaped channel 225 such that conduit may be installed to sit within the U-shaped channel 225. In an additional embodiment, the conduit engagement feature 260b is located within an interior aperture 240 formed by the hanger element 200 and the exterior surface 145 of the substrate panel 105 such that conduit 265 may be installed to run within the hanger element 200. In an additional embodiment, the conduit engagement feature 260a is connected to the U-shaped channel 228 such that conduit 265 may be installed to sit in on the surface 207 of the U-shaped channel 228. In an additional embodiment, the conduit engagement feature 260d may be connected to the exterior aperture 250 such that the conduit 265 may be installed to sit within the exterior aperture 250. In an additional embodiment, the conduit engagement feature 260e is located within the intermediate aperture 245 such that the conduit 265 may be installed to run within the hanger element 200.

FIG. 3 is a partial sectional front elevation schematic illustration of a demising wall assembly in accordance with at least some embodiments described herein. FIG. 3 shows a demising wall assembly 100; two substrate panels 105, 110; interior surfaces 135, 155; exterior surfaces 145, 165; a plurality of hanger elements 200, each with an interior surface 215 and a first exterior surface 220; a fastener 183; at least one individual finish panel 185 with an interior surface 185a, a first vertical edge 185b, a second vertical edge 185c, a top horizontal edge 185d, a bottom horizontal edge 185e, and an exterior surface 185f; and a finish panel retaining feature 230. The various components described in FIG. 3 are merely examples, and other variations, including eliminating components, combining components, and substituting components are all contemplated.

The interior surface 215 of the hanger element 200 may be attached to the exterior surfaces 145, 165 of the substrate panels 105, 110 using fasteners 183. A finish panel 185 may be adjacent to both the first exterior surface 220 and the finish panel retaining feature 230 of the hanger element 200. An individual finish panel 185 has an interior surface 185a, a first vertical edge 185b, a second vertical edge 185c, a top horizontal edge 185d, a bottom horizontal edge 185e, and an exterior surface 185f The interior surface 185a of the finish panel 185 may be adjacent to the first exterior surface 220, and the bottom horizontal edge 185e may be adjacent the finish panel retaining feature 230. In an alternate embodiment, the interior surface 185a of the finish panel may be adjacent to the first exterior surface 220, and the top horizontal edge 185d may be adjacent the finish panel retaining feature 230. An individual finish panel 185 may be attached to first exterior surface 220 of the hanger element 200 using fasteners 183 (not shown). It will be appreciated that one or multiple individual finish panels 185 may be attached to the hanger elements 200 of a demising wall assembly as may depend on a desired interior layout and or particular arrangement of the hanger elements 200.

FIG. 4 is a right side elevation schematic illustration of an embodiment demising wall assembly in accordance with at least some embodiments described herein. FIG. 4 shows a demising wall assembly 100; a first substrate panel 105 with an exterior surface 145; a plurality of hanger elements 200; and a plurality of angle brackets 305. The various components described in FIG. 4 are merely examples, and other variations, including eliminating components, combining components, and substituting components are all contemplated.

In an embodiment, the demising wall assembly 100 may contain multiple substrate panel panels 105 and 110 (shown in FIG. 1) connected to a plurality of hanger elements 200. The embodiment of the demising wall assembly 100 as shown in FIG. 4 has multiple first substrate panels 105 that encompass a majority length of the demising wall assembly 100. A plurality of hanger elements 200 are installed on the exterior surface 145 of the first substrate panels 105. A plurality of angle brackets 305 are connected to a lower portion of the exterior surfaces 145 of the first substrate panels 105. The hanger elements 200 may be regularly or irregularly spaced. In some examples, the vertical spacing between adjacent hanger elements 200 may be up to about 6 inches. In some examples, vertical spacing between adjacent hanger elements 200 may be greater than 6 inches, for example about 10 inches, about 12 inches or more. As previously described, in some examples, the hanger elements 200 may be implemented as discontinuous separate brackets, for example arranged in a pattern determined by a shape and size of a finish panel such that a hanger elements 200 is provided at least at the corners of a finish panel for attachment thereto.

FIG. 5 is a top plan schematic illustration of the demising wall assembly of FIG. 4 in accordance with at least some embodiments described herein. FIG. 5 shows a demising wall assembly 100, two substrate panels 105, 110 with interior surfaces 135, 155 and exterior surfaces 145, 165; a space 130 between the substrate panels 105, 110; a plurality of metal studs 175; a plurality of hanger elements 200; and a plurality of angle brackets 305. The various components described in FIG. 5 are merely examples, and other variations, including eliminating components, combining components, and substituting components are all contemplated.

A plurality of metal studs 175 with a length equivalent to the vertical height or the majority of the vertical height of the demising wall assembly 100 may be aligned vertically and connect the interior surface 135 of the first substrate panel 105 with the interior surface 155 of the second substrate panel 110. The plurality of metal studs 175 are spatially separated along the interior surfaces 135, 155. In an embodiment, the metal studs 175 may be shaped similar to a C-channel, with the opening of the interior studs facing the same direction. In a different embodiment, the vertical metal studs 175 may be shaped differently from each other. The hanger elements 200 may have a length that is substantially the same length as the overall demising wall assembly 100. The plurality of angle brackets 305 may be spatially separated along the exterior surfaces 145, 165.

Figure 6:
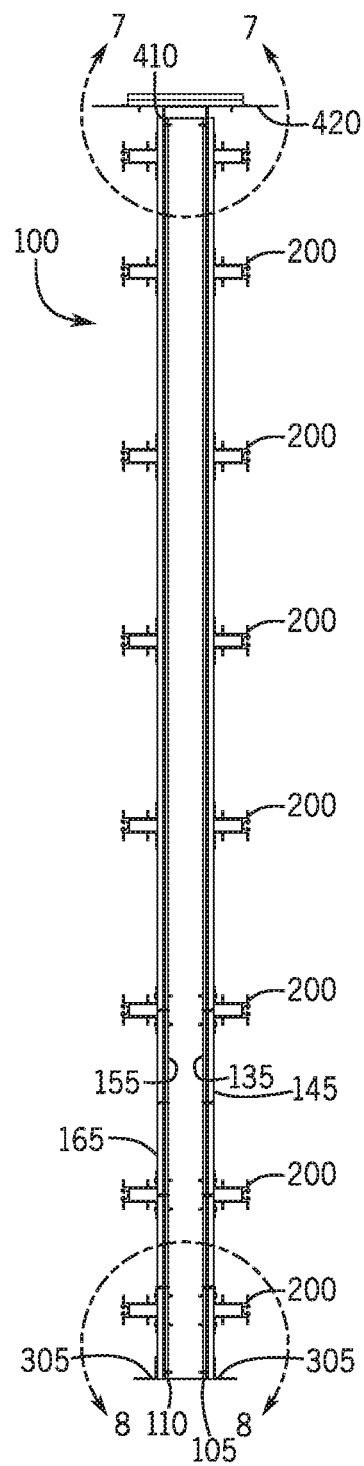
FIG. 6 is a cross sectional schematic illustration of the demising wall assembly of FIG. 4 taken along line 6-6.

FIG. 6 is a cross sectional schematic illustration of the demising wall assembly of FIG. 4 taken along line 6-6 in accordance with at least some embodiments described herein. FIG. 6 shows a demising wall assembly 100; two substrate panel 105, 110 with interior surfaces 135, 155 and exterior surfaces 145, 165; a space 130; a plurality of hanger elements 200; a plurality of angle brackets 305; a compensating track 410; and a metal strap 420. The various components described in FIG. 6 are merely examples, and other variations, including eliminating components, combining components, and substituting components are all contemplated.

In an embodiment shown in FIG. 6, the demising wall assembly 100 may be connected to the ceiling 120 (see e.g., FIG. 1) by way of a compensating channel 410 attached to a metal strap 420 and to the floor 115 (not pictured) by way of angle brackets 305. A plurality of hanger elements 200 may be connected to the exterior surfaces 145, 165 of the two substrate panels 105, 110. The details regarding the attachment to the ceiling are discussed in more detail below with reference to FIG. 7. The details regarding the attachment to the floor are discussed in more detail below with reference to FIG. 8.

Figure 7:
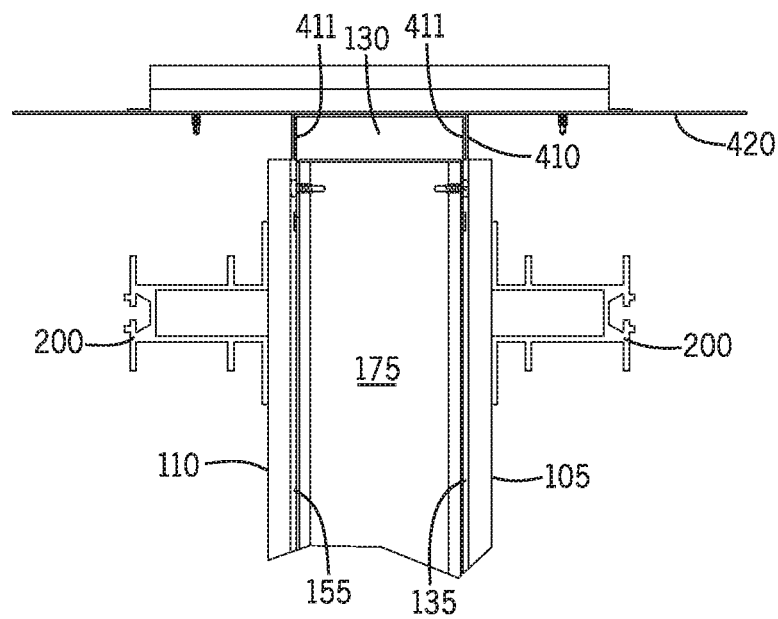
FIG. 7 is a partial schematic illustration of the demising wall of FIG. 6 taken along line 7-7.

FIG. 7 is a partial schematic illustration of the demising wall of FIG. 6 taken along line 7-7 in accordance with at least some embodiments described herein. FIG. 7 shows a demising wall assembly 100; two substrate panels 105, 110 with interior surfaces 135, 155 and exterior surfaces 145, 155; a space 130; a metal stud 175; a plurality of hanger elements 200; a compensating track 410; a metal strap 420; fasteners 183; and at least one downwardly extending flange 411. The various components described in FIG. 7 are merely examples, and other variations, including eliminating components, combining components, and substituting components are all contemplated.

FIG. 7 shows the top section of a demising wall assembly 100. The demising wall assembly 100 may include a compensating track 410 movably connected to one or more of the studs 175. The compensating track 410 may include a generally U-shaped channel (an inverted U-shape in the illustrated view) with opposing flanges 411. As shown in one embodiment, the compensating track 410 may be connected to a metal strap 420. During installation of the demising wall in a building, the metal strap may be connected to the ceiling 120 (see e.g., FIG. 1) and/or a structural frame of the building. In an alternate embodiment, a compensating track 410 may be connected directly to the ceiling 120 or the structural frame. The compensating track 410 may be arranged such that downward facing flanges 411 of the compensating track 410 may be received between the substrate panels 105, 110 and the metal studs 175. In some embodiments, an additional layer (e.g., a sound dampening layer, a fire barrier layer) may be provided between the interior surfaces 135, 155 of the substrate panels 105, 110 and the metal studs 175. The additional layer may terminate below the flanges 411 of the compensating track thereby defining a cavity wherein the flanges 411 may be received.

In some embodiments, the compensating track 410 may include at least one downwardly extending flange 411 which attaches to the plurality of metal studs 175 via fasteners 183 passing through a slot in the at least one downwardly extending flange 411. The slot may have a length to allow sufficient vertical movement of the at least one downwardly extending flanges 411 relative to the plurality of metal studs 175 to reduce the transfer of loads, for example from deflections of a floor 115 and ceiling 120, to the demising wall assembly 100.

Figure 8:
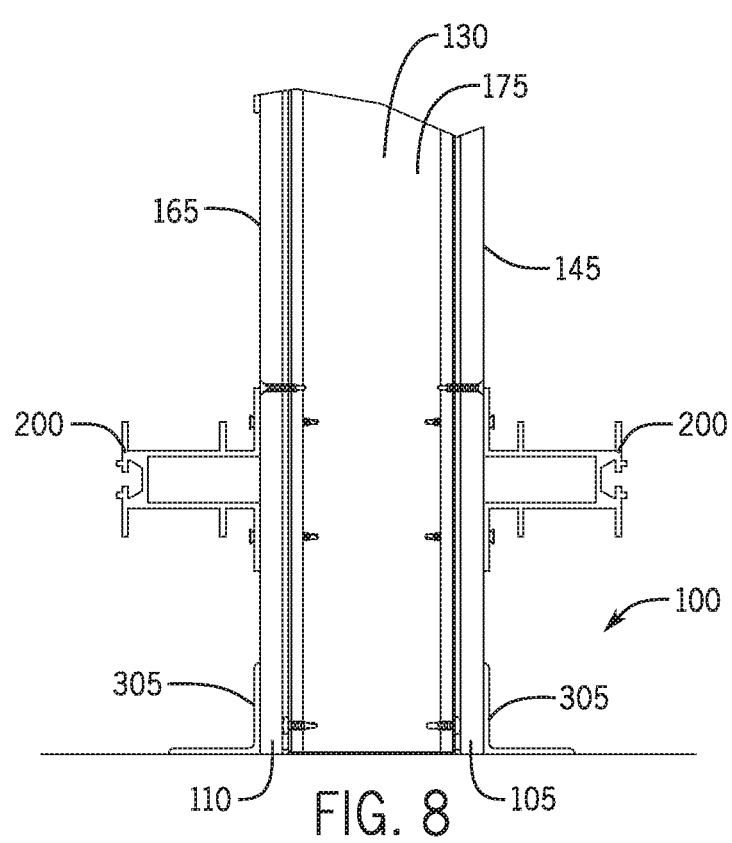
FIG. 8 is a partial schematic illustration of the demising wall of FIG. 6 taken along line 8-8.

FIG. 8 is a partial schematic illustration of the demising wall of FIG. 6 taken along line 8-8 in accordance with at least some embodiments described herein. FIG. 8 shows a demising wall 100; two substrate panels 105, 110 with exterior surfaces 145, 165; a space 130; a metal stud 175; a plurality of hanger elements 200; and a plurality of angle brackets 305. The various components described in FIG. 8 are merely examples, and other variations, including eliminating components, combining components, and substituting components are all contemplated.

In the embodiment of FIG. 8, the plurality of angle brackets 305 contact the exterior surfaces 145, 165 of the substrate panels 105, 110. The angle brackets 305 may be fastened to the floor 115 (not pictured) by fasteners 183 (not shown). The angle brackets 305 may then be fastened using fasteners 183 (not shown) to exterior surfaces 145, 165 of the substrate panels 105, 110.

Figure 9:
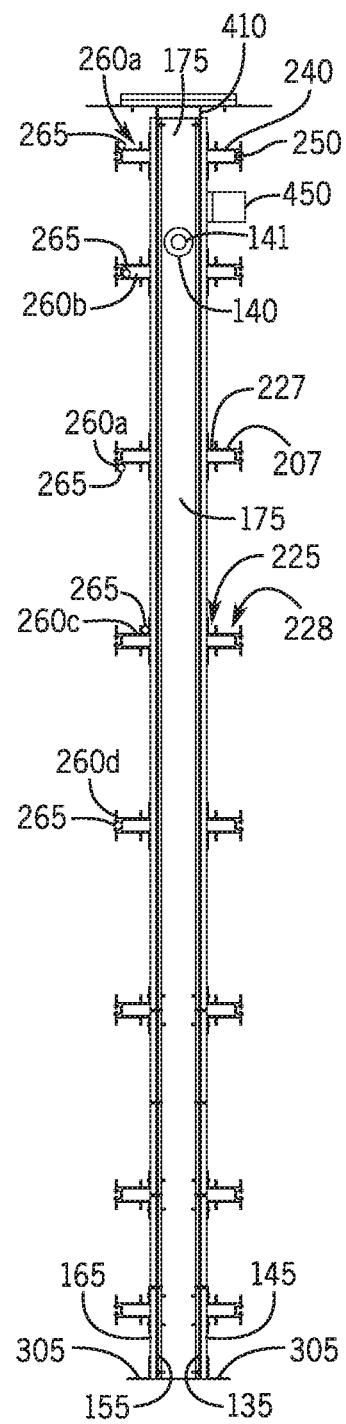
FIG. 9 is a cross sectional schematic illustration of the demising wall assembly of FIG. 4 taken along line 6-6.

FIG. 9 is a cross sectional schematic illustration of the demising wall assembly of FIG. 4 taken along line 6-6 in accordance with at least some embodiments described herein. FIG. 9 shows a demising wall assembly 100; two substrate panels 105, 110 with interior surfaces 135, 155, and exterior surfaces 145, 165; a space 130; a plurality of hanger elements 200; a plurality of angle brackets 305; an interior aperture 240; an exterior aperture 250; a compensating track 410; a metal stud 175; a metal strap 420; a conduit engagement feature 260, 260a, 260b, 260c, 260d; conduit 265; a U-shaped channel 228 with a surface 207, a U-shaped channel 225 with a surface 227; an air duct 450; a fire suppression pipeline aperture 140; and a fire suppression pipeline 141. The various components described in FIG. 5 are merely examples, and other variations, including eliminating components, combining components, and substituting components are all contemplated.

In an embodiment shown in FIG. 9, the demising wall assembly 100 has two substrate panels 105, 110 whose interior surfaces 135, 155 are attached by a plurality of metal studs 175. In an embodiment, each of the metal studs 175 has a fire pipeline suppression aperture 140. A fire suppression pipeline 141 may be installed through the aperture 140 of each of the metal studs 175. The demising wall assembly 100 also has a plurality of hanger elements 200 connected to the exterior surfaces 145, 165 of the two substrate panels 105, 110. The hanger element 200 features a conduit engagement feature 260 such that conduit 265 may be mounted in a variety of locations the length of the demising wall assembly. In one embodiment, the conduit engagement feature 260c is located on an interior surface 227 of a U-shaped channel 225 such that conduit may be installed to sit within the U-shaped channel 225. In an additional embodiment, the conduit engagement feature 260b is located within an interior aperture 240 formed by the hanger element 200 and the exterior surface 145, 165 of the substrate panels 105, 110 such that conduit 265 may be installed to run within the hanger element 200. In an additional embodiment, the conduit engagement feature 260a is connected to the U-shaped channel 228 such that conduit may 265 may be installed to sit in on the surface 207 of the U-shaped channel 228. In an additional embodiment, the conduit engagement feature 260d may be connected to the exterior aperture 250 such that the conduit 265 may be installed to sit within the exterior aperture 250.

Function and features of a demising wall assembly 100 as shown in FIGS. 1-9 will be described in further detail below.

The demising wall assembly may be assembled at a location away from the job site where it will ultimately be installed at. The assembly process may begin with connecting the metal studs 175, the substrate panels 105, 110, and the hanger elements 200. As shown in FIG. 5, the plurality of metal studs 175 may be spaced at various intervals along the length of the demising wall assembly 100 and are also placed at the ends 102 of the demising wall assembly 100.

A variety of additional components may be temporarily installed. This temporary installation increases the overall efficiency of the installation process. It ensures that the components are properly sized to fit the current demising wall assembly 100, saving the installers time in not having to measure and cut the items to length once at the job site. It also ensures that the required components are transported to the job site, saving the installers the time associated with looking for the correct parts to go with the assembly. It also prevents the potential mix up of materials such that the wrong components are cut or procured for the assembly, and prevents the possibility that the correct parts are misplaced or potentially scavenged for use in a different, incorrect assembly once at the job site, this saving installers time associated with fixing these issues.

In some embodiments, the metal studs 175 have fire suppression pipeline aperture 140, and a fire suppression pipeline 141 may be installed within the fire suppression pipeline aperture 140. In some embodiments, conduit 265 may be temporarily installed into conduit engagement feature 260 of at least one hanger elements 200. In some embodiments, sound insulation 190 may be temporarily installed above and below at least one hanger element 200. In some embodiments, an air duct 450 may be temporarily installed above or below at least one hanger element 200. In some embodiments, finish panels 185 may be temporarily installed wherein each finish panel contacts the first exterior surface 220 and the finish panel retaining feature 230 of a hanger element 200. In some embodiments, the compensating track 410 may be temporarily installed at the top of the demising wall assembly.

The preassembly demising wall assembly 100 may then be transported to the jobsite where it will be installed. Prior to permanent installation of the demising wall assembly 100, the finish panels 185, conduit 265, insulation 190, air duct 450, and compensating track 410 may be removed. The removal of these components increases the ease of the installation of the demising wall assembly 100, since the elements were may not be permanently attached to the demising wall assembly 100 and may shift and become damaged or damage other items during the pick and installation of the demising wall assembly 100.

Prior to installation of the demising wall assembly 100, the angle brackets 305 may be permanently attached to the floor 115. Additionally, the compensating track 410 may be attached to the ceiling 120, or it may be attached to a metal strap 420 which is then permanently attached to the ceiling 120. The installation of the angle brackets and the compensating track allows a footprint to be created that the demising wall assembly 100 may be slid in between. This eliminates error during installation since the footprint of the wall is correctly established prior to the installation of the wall. In an alternate embodiment, the angle brackets 305 may be connected to the demising wall prior to the wall being installed within the building.

The demising wall assembly 100, consisting of the two substrate panels 105, 110 connected by the plurality of metal studs 175 with attached hanger elements 200 may then be slid into place, wherein the bottom edge of the demising wall assembly 100 slides against the floor 115. When installed, the proper alignment and location of an embodiment of the demising wall assembly 100 is determined by the preinstalled angle brackets 305 and compensation track 410. The exterior surfaces 145, 165 may contact the inner surfaces of the angle brackets 305. Fasteners 183 may then be used to permanently attach the demising wall assembly 100 to the angle brackets 305. In an alternate embodiment where the angle brackets 305 are installed prior to the demising wall assembly 100 being slid into place, the compensating track 410 provides alignment of the demising well assembly 100 during instillation.

On the upper portion of the demising wall assembly 100, the interior surfaces 135, 155 may contact the at least one downwardly extending flange 411. The demising wall assembly 100 is not permanently connected to the ceiling 120, as the permanent connection may allow for the demising wall assembly to be potentially damaged when the floor or ceiling vertically shifts. The embodiment of the demising wall assembly 100 allows for the demising wall to shift with the expansion and contraction of the floor 115 and ceiling 120, such that the top edge of the demising wall assembly 100 is never in contact with the ceiling 120.

Once the demising wall assembly 100 is installed, the fire suppression pipeline 141 may be connected to the building's fire suppression system. The appropriate electrical wire may then be added to the conduit 265, which may then be connected to a conduit engagement feature 260. In an alternate embodiment, the appropriate electrical wire may be added to the conduit prior to transportation of the demising wall to the job site. In either embodiment, the wire may then be connected to the electrical system of the building. The air duct 450 may connected to the demising wall assembly and then be connected to the ventilation system of the building. Sound insulation 190 may then be installed to abut the exterior surfaces 145, 165. Once the internal demising wall components are connected to the demising wall assembly 100, the finish panels 185 may be connected to the hanger element 200.

In addition to the efficiencies gained by preassembling components offsite, the current embodiment's feature of having the conduit 265 installed on the exterior of the substrate panels 105, 110 comprises an improvement over the current art. As previously known in the art, when conduit is installed in between the substrate panels, the personnel installing the conduit and related equipment have a very small footprint to work with, and sometimes the installation of equipment may damage the substrate panels such that an acoustical envelope created between the substrate panels is broken and cannot be patched. As disclosed in an embodiment herein, when the conduit 265 is located behind only the finish panels 185, any type of maintenance involving the conduit or its contents may be done with less time and may be easier to accomplish as the interstitial space 130 between the substrate panels 105, 110 does not need to be breached to complete the maintenance.

In an alternate embodiment, the demising wall assembly 100 may have a plurality of vertical rods that may be joined to a vertical rod retaining feature of the plurality of hanger elements 200. The plurality of vertical rods may be placed such that the exterior vertical surfaces of the rods contact the vertical edges 185*b* and 185*c* of the finish panel 185. The plurality of vertical rods may have a consumer attachment feature that enables a consumer to removably attach items, (e.g. bookshelves, pictures, etc.) to the vertical rod without damaging the overall demising wall assembly. This may enable a user (e.g., tenant or occupant of a unit) to customize his or her unit without permanent modification and/or damage to a wall finish or structure. This feature may allow a tenant the ability to temporarily hang items with the ability to change locations as desired.

In an alternate embodiment, the demising wall assembly 100 may also feature an aluminum composite material (ACM) panel installed between the exterior surfaces 145, 165 of the substrate panels 105, 110. In the example embodiment, an embodiment demising wall assembly 100 with an ACM panel may be positioned in a lower position. The ACM panel has an interior surface, a top horizontal edge, a bottom horizontal edge, and an exterior surface. In the lower position, the bottom horizontal edge of the ACM panel rests in the U-shaped channel 225 of the uppermost positioned plurality of hanger elements 200. The exterior surface of the ACM panel may also contact against an interior surface 227 of the U-shaped channel 225. Alternatively, the interior surface of the ACM panel may also contact against an interior surface 227 of the U-shaped channel 225. The interior width 226 of the U-shaped channel 225 is at least slightly larger than the width of the ACM panel. There is a gap between the top horizontal edge of the ACM panel and the ceiling 120. In the lower position, the top horizontal edge of the ACM panel is vertically lower than the top edge of the demising wall assembly 100. Prior to the permanent installation of the demising wall assembly 100, the ACM panel may be in this first position.

After the demising wall assembly 100 is permanently connected to the floor 115, the ACM panel may be moved into an upper position. In this upper position, the top horizontal edge of the ACM panel is flush or nearly flush with the ceiling 120 such that the bottom horizontal edge of the ACM panel no longer rests in the U-shaped channel 225 of the uppermost positioned plurality of hanger elements 200. The ACM panel in this upper position may be attached to the compensating track 410 through fasteners 183. It is feasible that in this upper position, the exterior surface of the ACM panel may still contact against an interior surface 227 of the U-shaped channel 225 or the interior surface of the ACM panel may alternatively contact against an interior surface 227 of the U-shaped channel 225. Any vertical shifting of the floor or ceiling may not damage the ACM panel as the ACM panel moves with the ceiling and there should be a sufficient gap between the bottom edge of the ACM panel and the U shaped channel 225.

The examples provided are for explanatory purposes only and should not be considered to limit the scope of the disclosure. Each example embodiment may be practical for a particular environment such as urban mixed-use developments, low-rise residential units, and/or remote communities. Materials and dimensions for individual elements may be configured to comply with one or more of the following building codes: fire, energy, handicap, life-safety, and acoustical (impact and ambient noise transfer) without departing from the scope of the principles of the disclosure. The elements and/or system may also be configured to comply with social and/or religious codes as desired. For example, materials, systems, methods, and/or apparatuses may be configured to comply with the International Building Code as it has been adopted in a jurisdiction.

The present disclosure is not to be limited in terms of the particular embodiments described in this application, which are intended as illustrations of various aspects. Many modifications and embodiments can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and embodiments are intended to fall within the scope of the appended claims. The present disclosure includes the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

The herein described subject matter sometimes illustrates different components contained within, or connected with, different other components. It is to be understood that such depicted architectures are merely embodiments, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific embodiments of operably couplable include but are not limited to physically mateable and/or physically interacting components and/or wirelessly interactable and/or wirelessly interacting components and/or logically interacting and/or logically interactable components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A prefabricated demising wall assembly, comprising:
two substrate panels each with an interior and exterior surface, wherein the two substrate panels are configured to span between a floor and a ceiling of a building unit;
a plurality of metal studs that connect the interior surfaces of the two substrate panels, wherein the plurality of metal studs define a space between the substrate panels;
a fire sprinkler pipeline between the two substrate panels, wherein at least some of the plurality of metal studs have an aperture that accommodates the fire sprinkler pipeline through an interior of the demising wall assembly;
a plurality of hanger elements operably attached to the exterior surfaces of the two substrate panels, wherein the plurality of hanger elements are configured to connect to a plurality of removable finish panels; and
a conduit exterior to the two substrate panels, wherein the conduit is received, at least partly, in a channel of at least one hanger element of the plurality of hanger elements.

2. The demising wall assembly of claim 1, wherein the at least one hanger element comprises an elongate member having a constant cross-section and that extends horizontally along substantially a full length of at least one of the substrate panels.

3. The demising wall assembly of claim 2, wherein the elongate member comprises a fiber reinforced plastic.

4. The demising wall assembly of claim 1, wherein the at least one hanger element comprises an extruded aluminum member.

5. The demising wall assembly of claim 1, further comprising a compensating track along a top portion of the demising wall assembly for connection of the demising wall assembly, wherein the compensating track is movably coupled to the plurality of metal studs.

6. The demising wall assembly of claim 5, further comprising a strap coupled to the compensating track and that extends outward from opposing sides of the compensating track, wherein a length of the strap is greater than a distance between outward most ends of the hanger elements.

7. The demising wall assembly of claim 5, wherein:
the compensating track comprises at least one downwardly extending flange with a slot; and
at least one of plurality of the metal studs is slidably connected to the least one downwardly extending flange via the slot.

8. The demising wall assembly of claim 1, wherein the channel comprises a U-shaped channel defined by an exterior surface of the at least one hanger element.

9. The demising wall assembly of claim 1, wherein the channel comprises a cavity defined by one or more interior surfaces of the at least one hanger element.

10. A method to assemble a prefabricated demising wall in a building, the method comprising:
placing a demising wall assembly over a first beam of a structural frame of a building, wherein the demising wall assembly includes two wall substrate panels and metal studs that connect interior surfaces of the wall substrate panels, wherein a fire suppressant pipeline is installed between the two wall substrate panels, wherein at least some of the metal studs have an aperture that accommodates the fire suppressant pipeline through an interior of the demising wall assembly, wherein the demising wall assembly further includes a plurality of hanger elements operably attached to exterior surfaces of the two wall substrate panels, wherein the plurality of hanger elements are configured to connect to a plurality of removable wall finish panels, and wherein a conduit exterior to the two wall substrate panels is received, at least partly, in a channel of at least one hanger element of the plurality of hanger elements;
attaching a lower portion of the demising wall assembly to the structural frame using angle brackets attached to opposite sides of the demising wall assembly; and
connecting an upper portion of the demising wall assembly to an upper floor and ceiling panel using a compensating track movably connected to the metal studs.

11. The method of claim 10, further comprising installing a lower floor and ceiling panel prior to placing the demising wall assembly over the first beam, wherein the installing the lower floor and ceiling panel includes attaching the lower floor and ceiling panel to the first beam using an angle iron, and wherein the attaching the lower portion of the demising wall assembly to the structural frame includes attaching the lower portion of the demising wall assembly to the angle iron of the demising wall assembly.

12. The method of claim 10, further comprising installing a lower floor and ceiling panel prior to placing the demising wall assembly underneath a second beam, wherein the connecting the upper portion of the demising wall assembly to the upper floor and ceiling panel includes attaching a metal strap to the upper floor and ceiling panel.

13. The method of claim 10, wherein the plurality of hanger elements have interior and exterior surfaces, and wherein the interior surface of each of the plurality of hanger elements is connected to the exterior surface of at least one of the two wall substrate panels.

14. The method of claim 13, further comprising attaching a wall finish panel to one or more of the plurality of hanger elements such that a cavity is defined between the wall finish panel and the exterior surface of the at least one of the two wall substrate panels.

15. The method of claim 10, wherein the conduit is routed through the channel of the at least one hanger element of the plurality of the hanger elements prior to placing the demising wall assembly over the first beam.

16. The method of claim 10, further comprising connecting the installed fire suppressant pipeline to a fire suppression system in the building.

17. A method to assemble a prefabricated demising wall assembly at a site distant from a building site, the method comprising:
attaching a plurality of non-combustible boards to a frame comprising a plurality of metal studs to form two wall substrate panels of a demising wall panel separated by a space therebetween, wherein each of the two wall substrate panels has an interior and exterior surface, wherein the two wall substrate panels are configured to span between a floor and a ceiling of a building unit, wherein a fire sprinkler pipeline is positioned between the two wall substrate panels, and wherein at least some of the plurality of metal studs have an aperture that accommodates the fire sprinkler pipeline through the space between the two wall substrate panels;
attaching interior surfaces of each of a plurality of hanger elements to the exterior surface of at least one of the two wall substrate panels;
installing a conduit configured to route electrical wire to or proximate to at least one of the plurality of hanger elements, wherein the conduit is installed exterior to the two wall substrate panels and is received, at least partly, in a channel of at least one hanger element of the plurality of hanger elements;
installing electrical wire into the conduit; and
removably installing a plurality of finish panels to the plurality of hanger elements.

18. The method of claim 17, wherein installing the conduit configured to route the electrical wire includes installing the conduit within a space between the one of the two wall substrate panels and one of the plurality of the finish panels, and wherein each of the plurality of hanger elements have the channel which forms an aperture wherein the conduit is installed within.

19. The method of claim 17, wherein the plurality of hanger elements have an interior aperture and an exterior aperture, and wherein the conduit is installed within the interior aperture that is formed by the channel.

20. The method of claim 17, wherein the plurality of hanger elements have an interior aperture and an exterior aperture, and wherein the conduit is installed within the exterior aperture that is formed by the channel.

21. The method of claim 17, wherein the plurality of hanger elements have an interior aperture, an intermediate aperture, and an exterior aperture, and wherein the conduit is installed within the intermediate aperture that is formed by the channel.

22. The method of claim 17, wherein the conduit is installed temporarily.

23. The method of claim 17, wherein each of the plurality of hanger elements further comprise a first horizontal surface and a second horizontal surface, and wherein the method further comprises:

temporarily installing sound insulation between the first horizontal surface of a first hanger element and the second horizontal surface of a second hanger element.

\* \* \* \* \*